United States Patent [19]
Tsukamoto et al.

[11] Patent Number: 5,819,163
[45] Date of Patent: Oct. 6, 1998

[54] PORTABLE REMOTE TERMINAL HAVING IMPROVED STRUCTURE

[75] Inventors: Yoshifumi Tsukamoto, Sapporo; Shigeru Takahashi, Kawasaki; Yoshiaki Katou, Kawasaki; Hisamitsu Takagi, Kawasaki, all of Japan

[73] Assignee: Fujitsu Limited, Kawasaki, Japan

[21] Appl. No.: 706,644

[22] Filed: Sep. 6, 1996

Related U.S. Application Data

[63] Continuation of Ser. No. 301,406, Sep. 8, 1994, abandoned.

[30] Foreign Application Priority Data

Mar. 9, 1994 [JP] Japan ................................. 6-038713

[51] Int. Cl.⁶ ..................................................... H04B 1/38
[52] U.S. Cl. ............................. 455/90; 455/348; 455/349
[58] Field of Search ............................. 455/89, 90, 347, 455/348, 349, 350, 351, 300, 550; 379/428, 429, 433, 434; 361/815, 818

[56] References Cited

U.S. PATENT DOCUMENTS

| | | |
|---|---|---|
| 4,257,121 | 3/1981 | Henderson et al. .................. 455/89 |
| 4,375,584 | 3/1983 | Muzumdar et al. ................. 379/428 |
| 5,150,282 | 9/1992 | Tomura et al. ..................... 455/300 |
| 5,206,796 | 4/1993 | Thompson et al. .................. 361/818 |
| 5,257,310 | 10/1993 | Takagi et al. . |
| 5,271,056 | 12/1993 | Pesola et al. . |
| 5,424,921 | 6/1995 | Davis, II et al. .................... 361/816 |

OTHER PUBLICATIONS

U.S. application No. 08/054,019, Takagi, filed Apr. 29, 1993.

Primary Examiner—Reinhard J. Eisenzopf
Assistant Examiner—Marsha D. Banks-Harold
Attorney, Agent, or Firm—Armstrong Westerman Hattori McLeland & Naughton

[57] ABSTRACT

A portable remote terminal includes a case, and a remote terminal body assembly into which at least a printed-circuit board having electric circuits required for the portable remote terminal and a loudspeaker electrically connected to the printed-circuit board are assembled, the remote terminal body assembly being housed in the case.

13 Claims, 47 Drawing Sheets

50
55

54  50
94

50

50  94

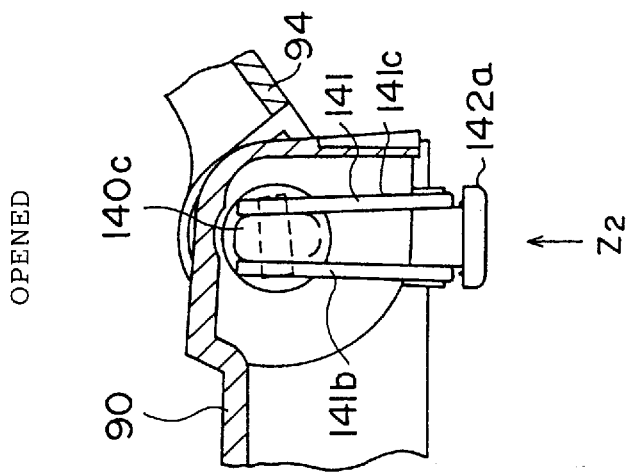
FIG. 24A CLOSED
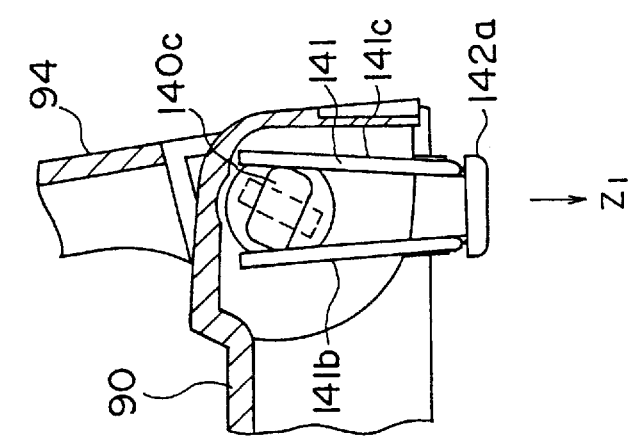
FIG. 24B
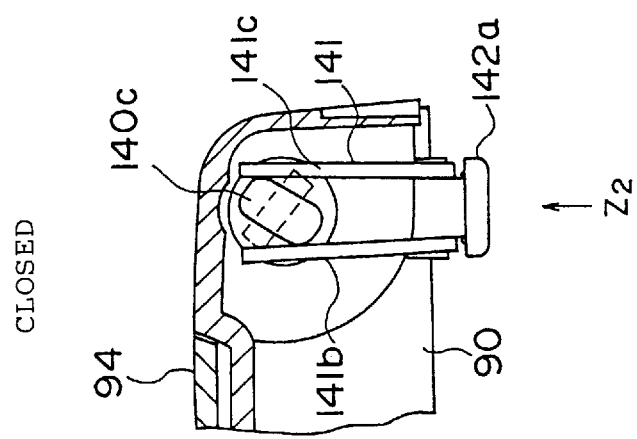
FIG. 24C OPENED

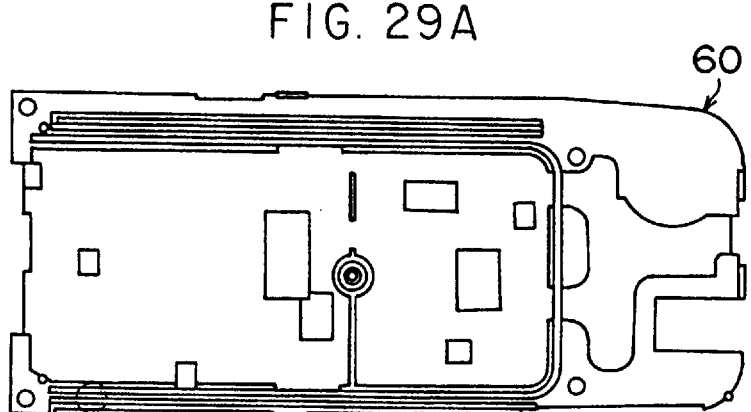
FIG. 29A
SEE FIG. 29C
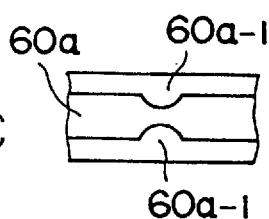
FIG. 29C
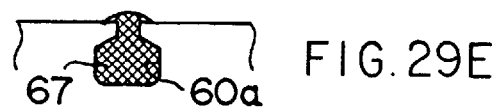
FIG. 29D
FIG. 29E
SEE FIG. 29C
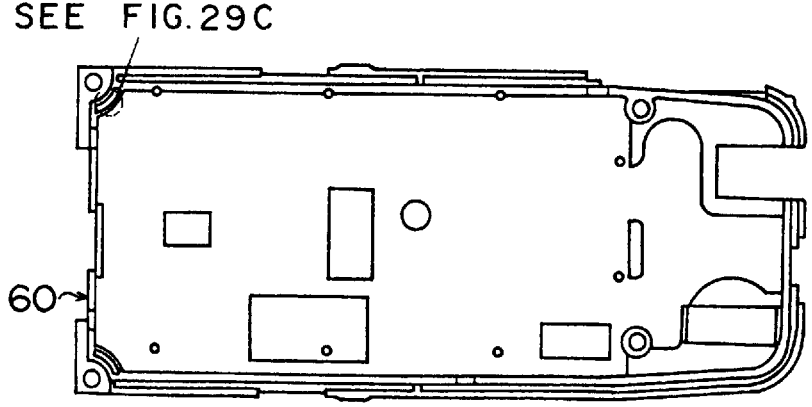
FIG. 29B

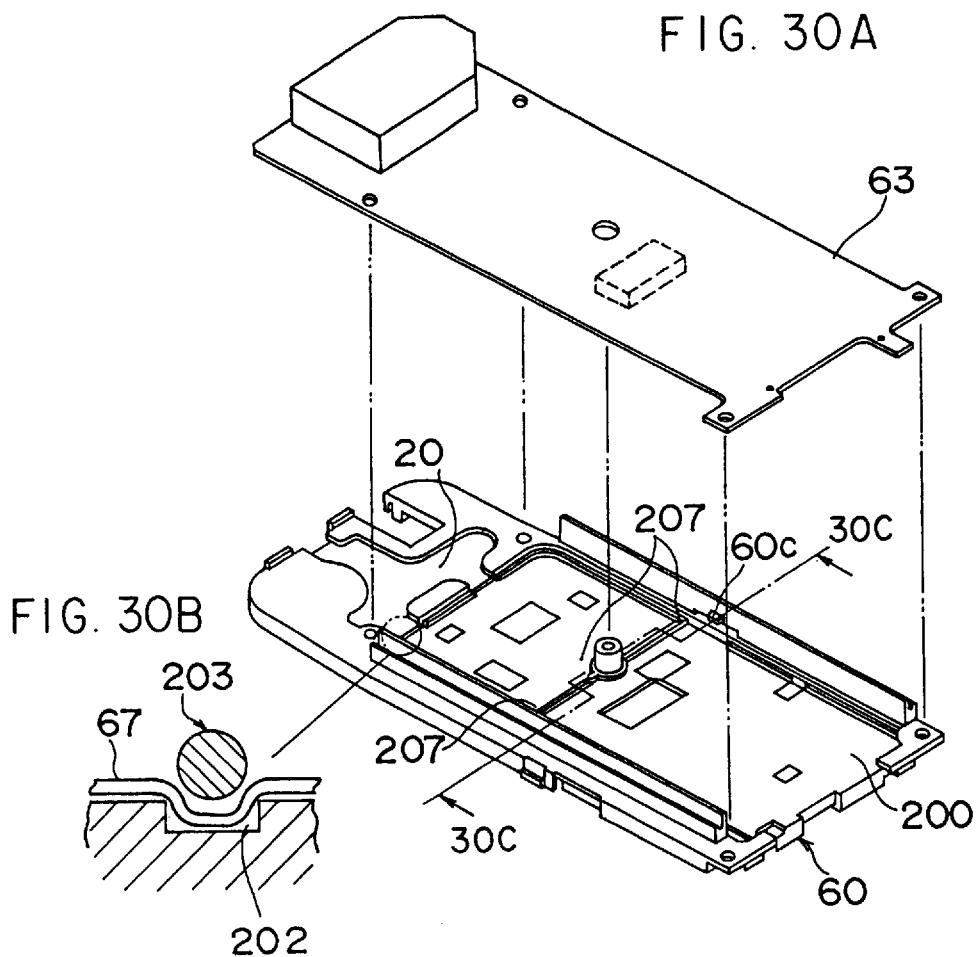
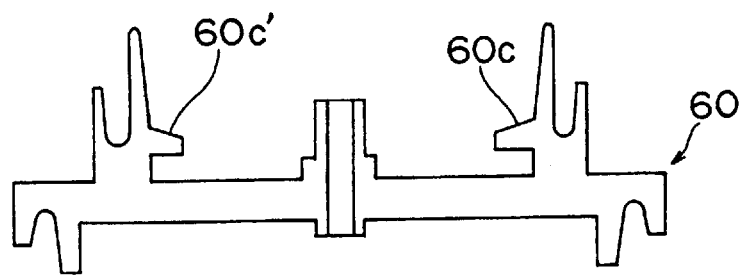

FIG. 31A
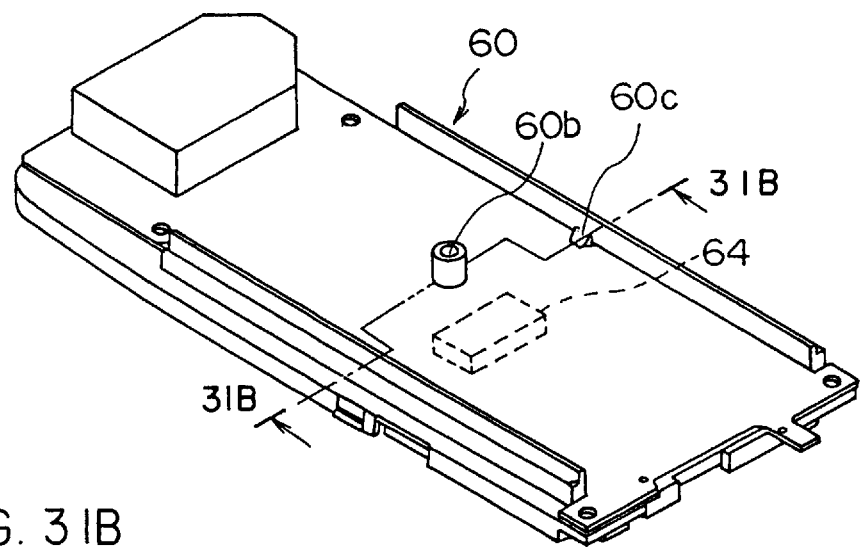
FIG. 31B
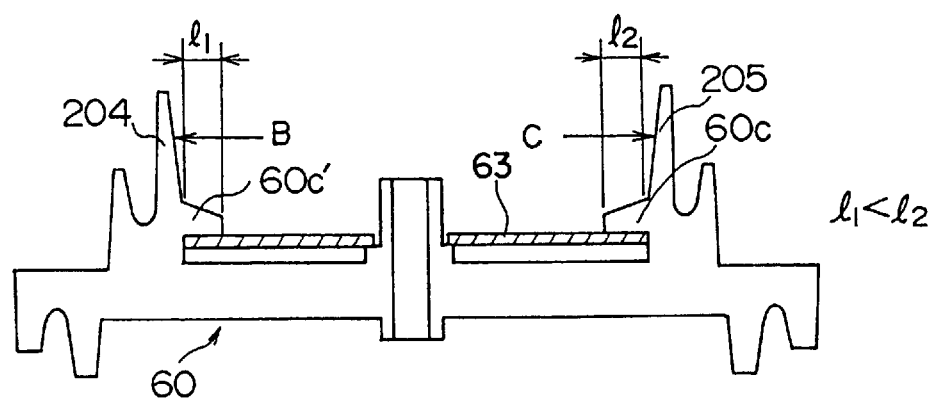
$l_1 < l_2$
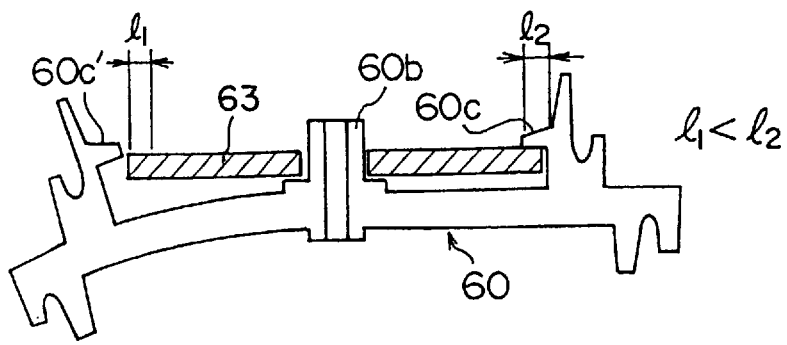
$l_1 < l_2$
FIG. 31C FIG. 32A
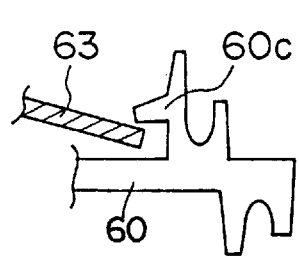
FIG. 32B
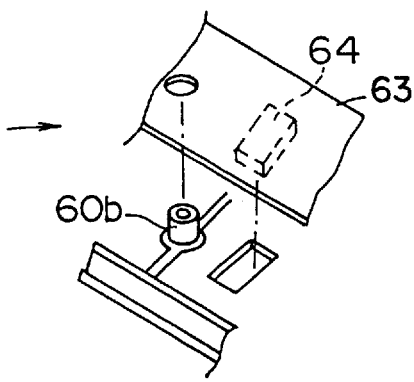
FIG. 32C
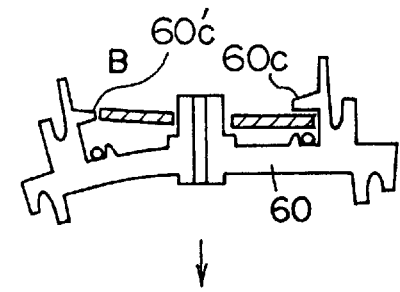
FIG. 32E
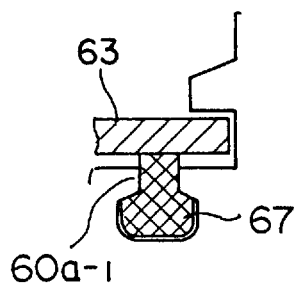
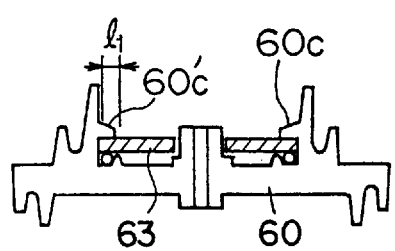
FIG. 32D

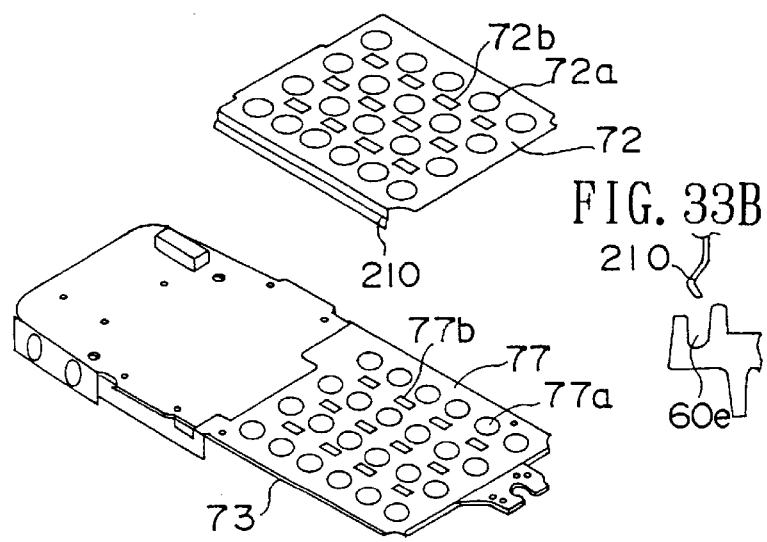
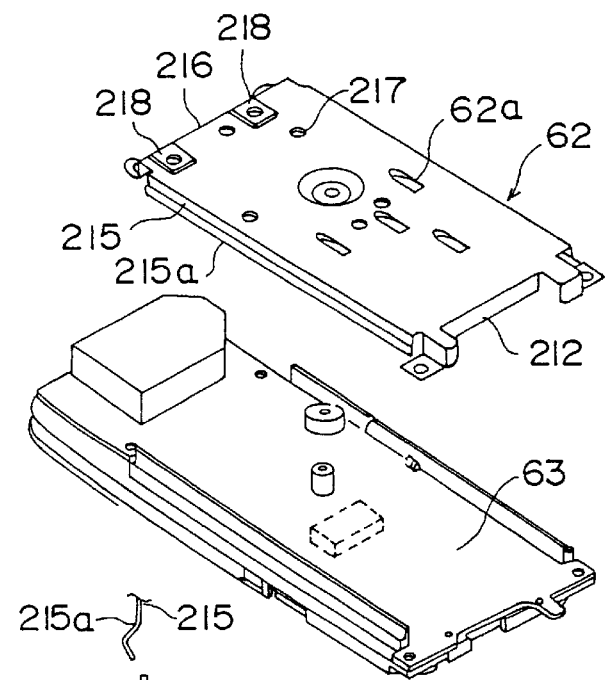
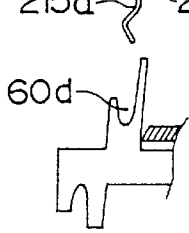
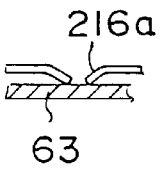

$\ell > m$
$\ell' = m$

B DETAIL

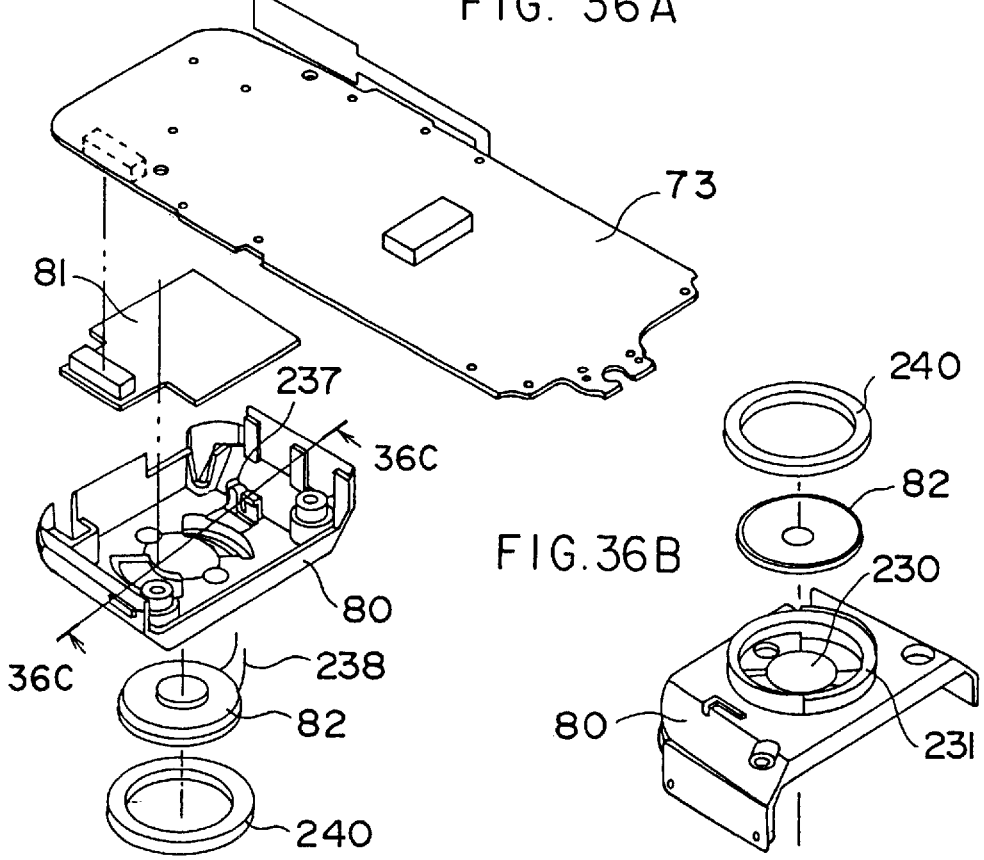
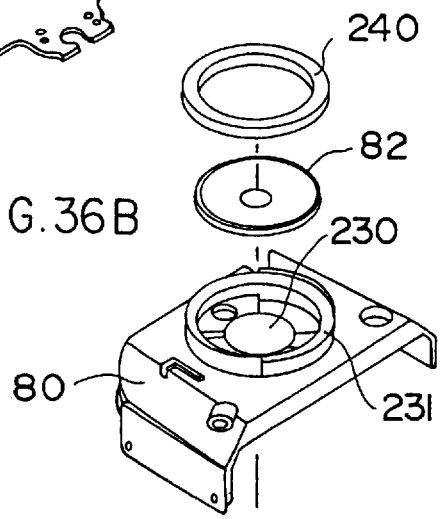
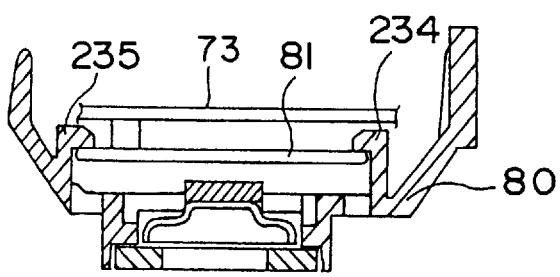
FIG. 36A
FIG. 36B
FIG. 36C

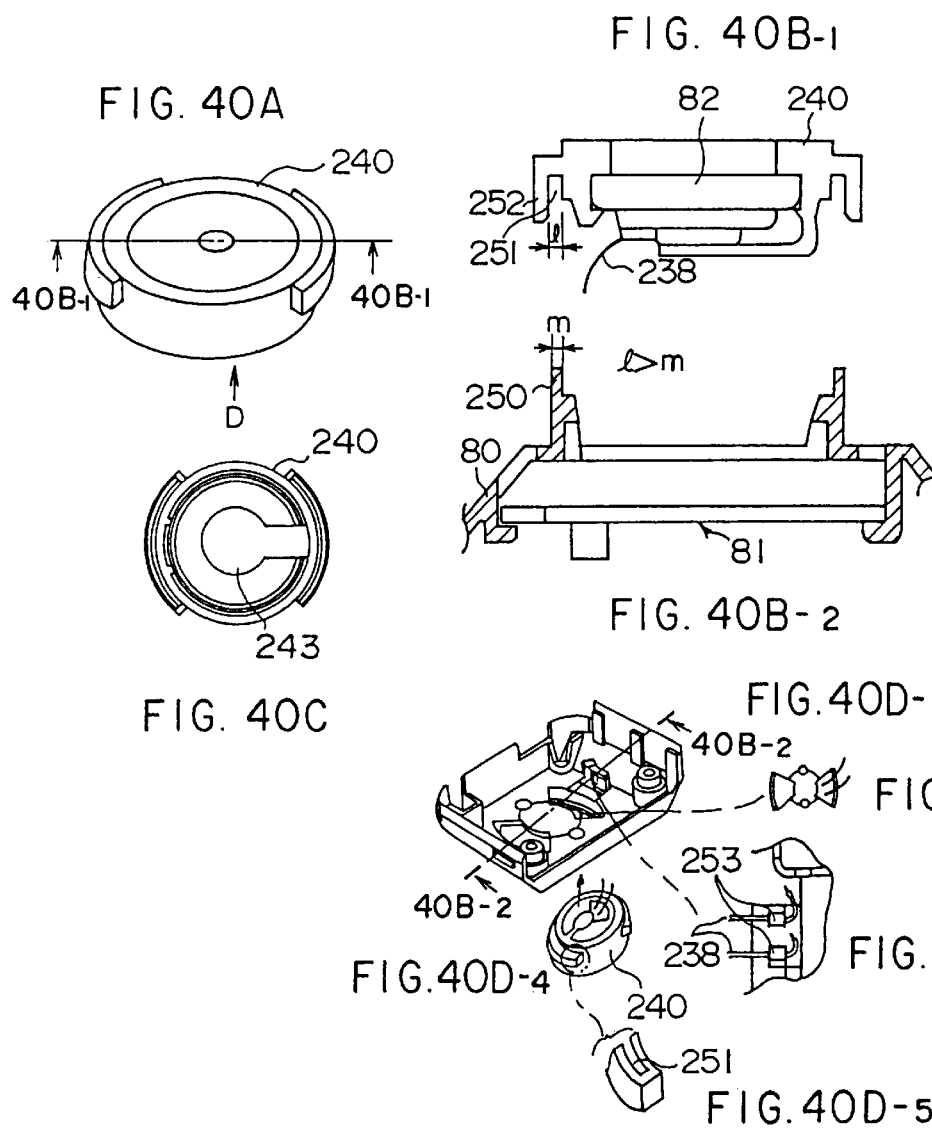

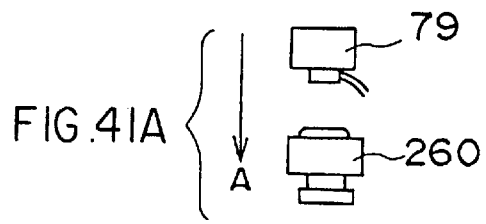
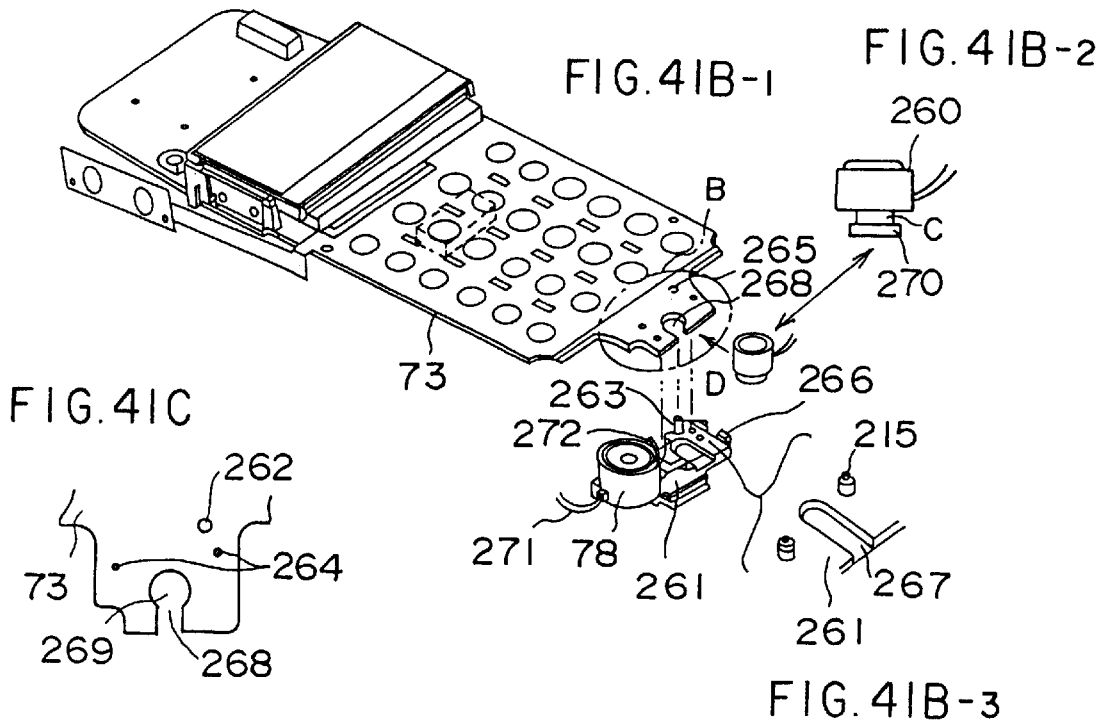
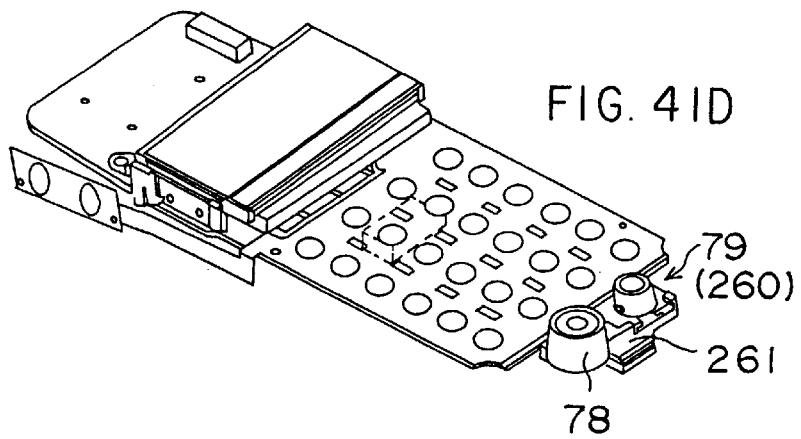

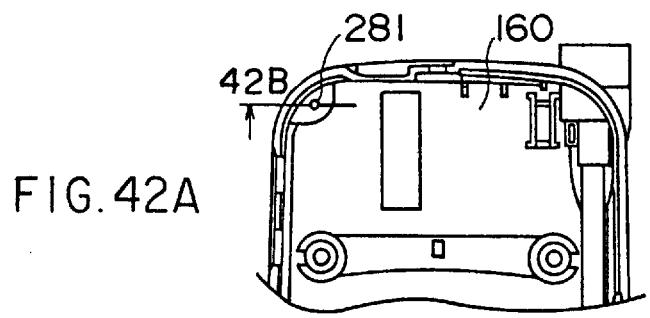
FIG.42A
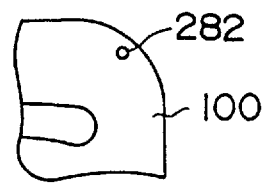
FIG.42B
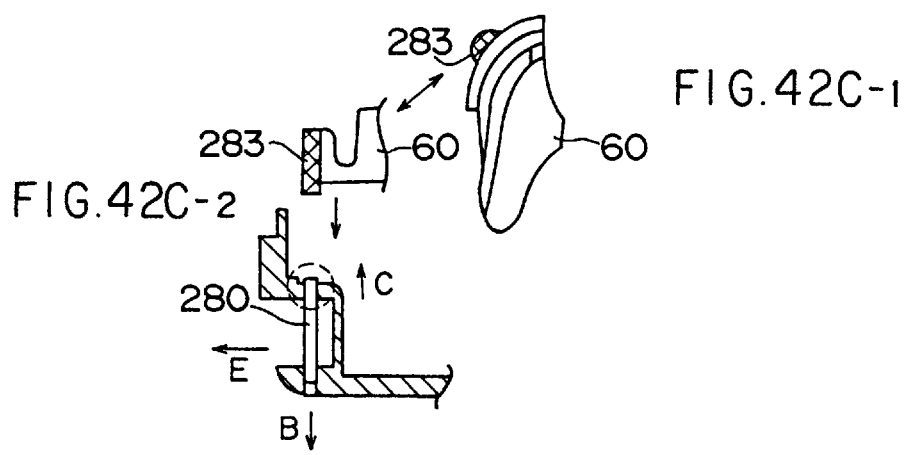
FIG.42C-1
FIG.42C-2
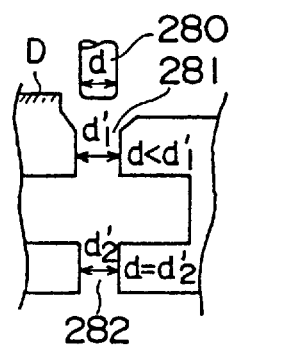
FIG.42D

5,819,163

PORTABLE REMOTE TERMINAL HAVING IMPROVED STRUCTURE

This application is a continuation of application Ser. No. 08/301,406 filed Sep. 8, 1994, now abandoned.

BACKGROUND OF THE INVENTION (1) Field of the Invention

The present invention relates to a portable remote terminal, such as a portable telephone.

(2) Description of the Related Art

FIGS. 1 and 2 show an example of a conventional portable telephone. FIG. 1 is an exploded perspective view showing the conventional portable telephone and FIG. 2 is a cross sectional view showing the conventional portable telephone.

Referring to FIGS. 1 and 2, a portable telephone 10 has a structure in which a telephone body 11 is housed in a case 14 formed of a front case 12 and a rear case 13. The telephone body 11 is provided with circuit boards (not shown). A loudspeaker 15 is mounted on an inner surface of the front case 12. A wire 16 is led from the loudspeaker 15, and a connector 17 is mounted at a tip end of the wire 16. The connector 17 is inserted in a connector 18 of the telephone body 11 so that the loudspeaker 15 is coupled to the telephone body 11. As to a shielding structure, an aluminum evaporation film 21 is formed in the inner surface of the front case 12, and an aluminum evaporation film 22 is formed in the inner surface of the rear case 13. An earth circuit pattern on a printed-circuit board 25 positioned at a top surface side of the telephone body 11 is electrically connected to the aluminum evaporation film 21 formed on the front case 12. An earth circuit pattern on a printed-circuit board 26 positioned at a bottom surface side of the telephone body 11 is electrically connected to the aluminum evaporation film 22 of the rear case 13 via a conductive rubber 27.

The above conventional portable telephone 10 has the following disadvantages.

1) In addition to mounting the telephone body 11 between the front case 12 and the rear case 13, it is necessary to insert the connector 17 in the connector 18. Thus, the number of assembly steps for assembling the portable telephone 10 is increased, so that the production cost of the portable telephone 10 is relatively high.

2) The cost of the aluminum evaporation films is relatively high. Thus, the front and rear cases 12 and 13 are relatively expensive, so that the production cost of the portable telephone is relatively high.

3) The loudspeaker 15 and the telephone body 11 mounted in the case 14 are coupled to each other so that the telephone body 11 is shielded. Thus, the performance testing of the portable telephone 10 is performed after the telephone body 11 is mounted in the case 14. As a result, the front case 12 and/or the rear case 13 may be damaged during the performance testing and thus must be exchanged. In addition, in a case where the portable telephone 10 is adjusted based on results of the performance testing, the front case 12 and the rear case 13 must be separated from each other. This work is troublesome, so that the production cost of the portable telephone 10 is increased.

SUMMARY OF THE INVENTION

Accordingly, a general object of the present invention is to provide a novel and useful portable remote terminal in which the disadvantages of the aforementioned prior art are eliminated.

A more specific object of the present invention is to provide a portable remote terminal having a structure for which the production cost can be decreased.

The above objects of the present invention are achieved by a portable remote terminal comprising: a case; and a remote terminal body assembly into which at least a printed-circuit board having electric circuits required for the portable remote terminal and a loudspeaker electrically connected to the printed-circuit board are assembled, the remote terminal body assembly being housed in the case.

According to the present invention, since the loudspeaker is assembled into the remote terminal body assembly electrically connected to the printed-circuit board, the remote terminal body assembly can be housed in the case without a step for connecting the loudspeaker to the printed-circuit board. As a result, the number of assembling steps for assembling the portable remote terminal can be decreased, so that the production cost of the portable remote terminal can be decreased.

A shield plate for shielding the printed-circuit board may be assembled into the remote terminal body assembly.

In this case, it is not necessary to evaporate an aluminum film on an inner surface of the case. Thus, the production cost can be decreased.

In addition, since the loudspeaker, the printed-circuit board and the shield plate are assembled into the remote terminal body assembly, the performance testing can be carried out in a state where the remote terminal body assembly is not housed in the case. Thus, there is no instance where the case is damaged. Furthermore, in an instance where the portable telephone is adjusted based on the results of the performance testing, it is not necessary to take out the remote terminal body assembly from the case.

As a result, the production cost of the portable remote terminal can be decreased.

BRIEF DESCRIPTION OF THE DRAWINGS

Other objects, features and advantages of the present invention will become more apparent from the following detailed description when read in conjunction with the accompanying drawings, in which:

FIGS. 24A, 24B and 24C are diagrams illustrating operations of the pivotally supporting structure when the lid is opened and closed;

FIGS. 29A, 29B, 29C, 29D and 29E are diagrams illustrating a structure in which a rubber tube shown in FIG. 9 is mounted on a printed-circuit board;

FIGS. 30A, 30B and 30C are diagrams illustrating structures of a printed-circuit board 63 and a chassis 60;

FIGS. 31A, 31B and 31C are diagrams illustrating a structure in which the printed-circuit board 63 is mounted on the chassis 60;

FIGS. 32A, 32B, 32C, 32D and 32E are diagrams illustrating a procedure in which the printed-circuit board 63 is mounted on the chassis 60;

FIGS. 33A, 33B, 33C, 33D and 33E are diagrams illustrating a structure in which shield palates are mounted on the chassis;

FIGS. 36A, 36B and 36C are diagrams illustrating a structure of a holder;

FIGS. 40A, 40B, 40C, 40D and 40E are diagrams illustrating a structure in which the loudspeaker is mounted in the holder;

FIGS. 41A, 41B, 41C and 41D are diagram illustrating attachment of a microphone to the printed-circuit board;

FIGS. 42A, 42B, 42C and 42D are diagrams illustrating a structure in which a strap pin is mounted in the case;

DESCRIPTION OF THE PREFERRED EMBODIMENTS

Figure 1:
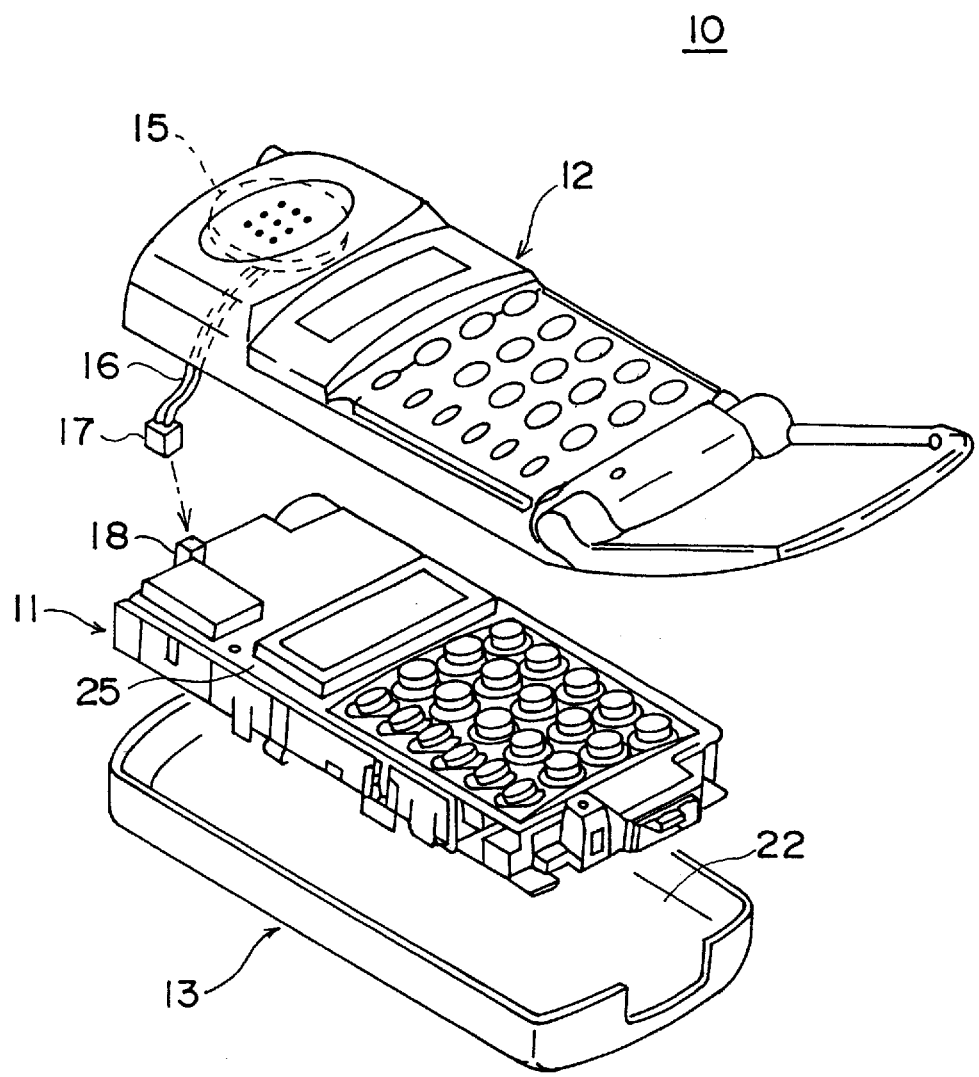
FIG. 1 is an exploded perspective view showing a structure of a conventional portable telephone.
Figure 2:
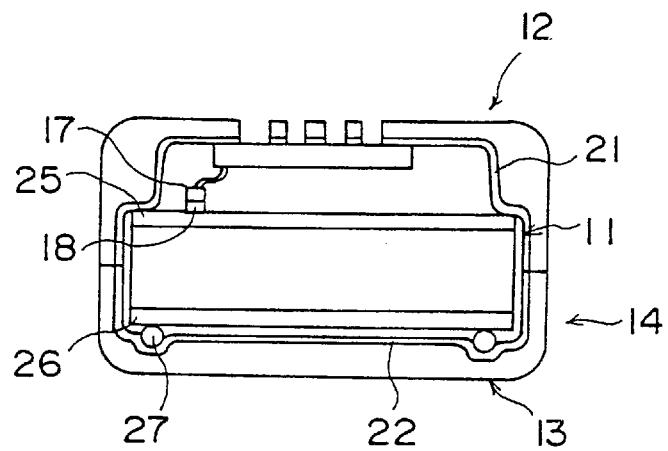
FIG. 2 is a cross sectional view showing the conventional portable telephone.
Figure 3:
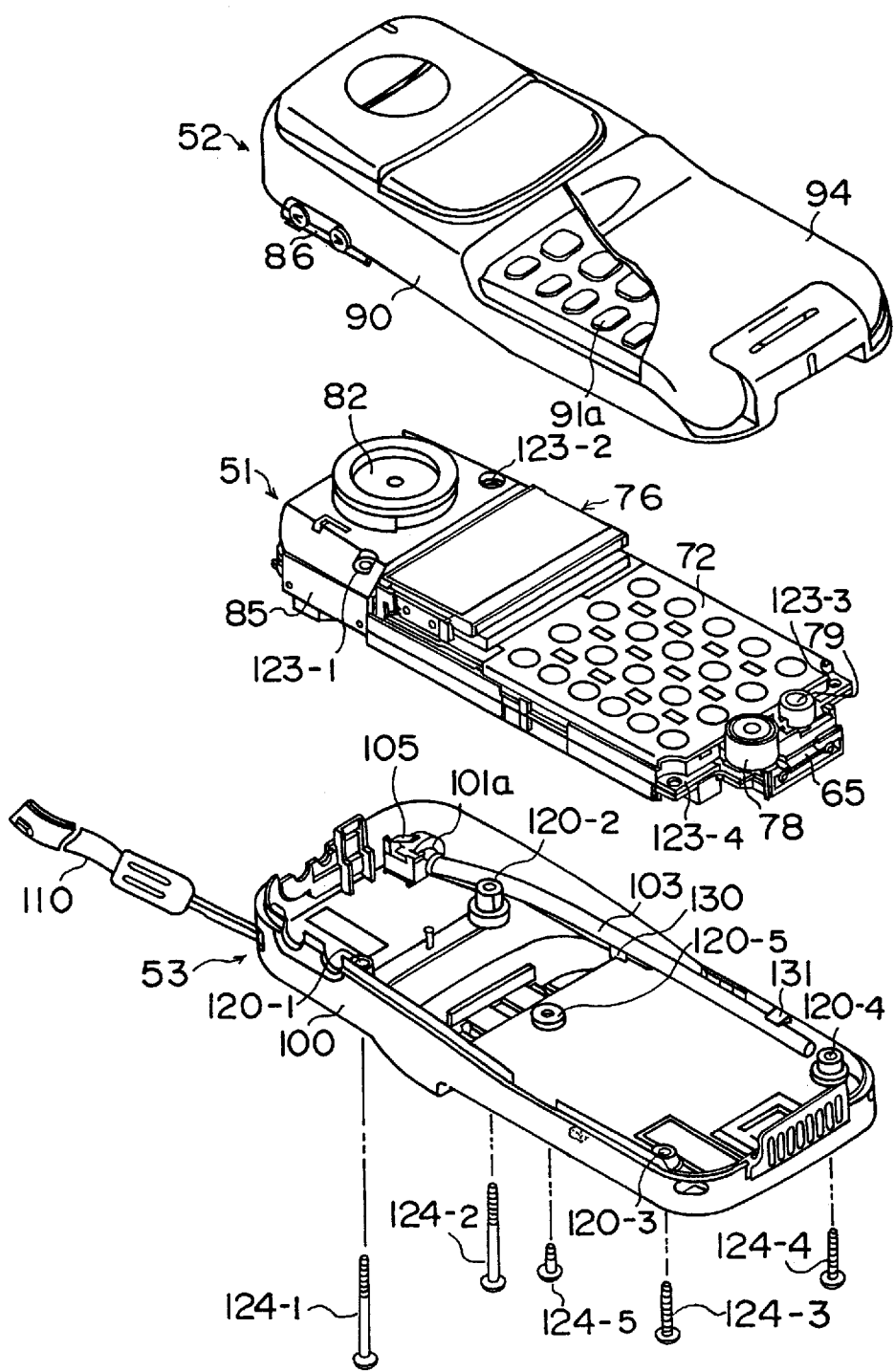
FIG. 3 is an exploded perspective view showing a portable telephone according to an embodiment of the present invention.
Figure 4A:
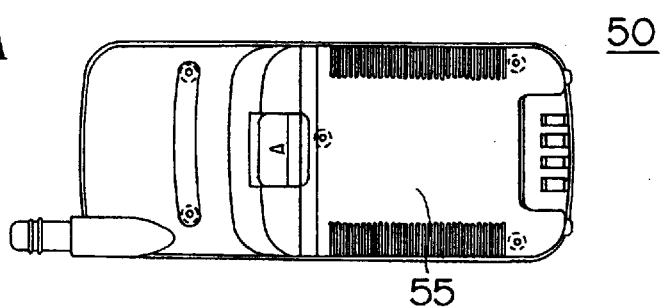
FIGS. 4A, 4B, 4C, 4D, 4E and 4F are diagrams illustrating exterior views of the portable telephone according to the embodiment of the present invention.
Figure 4B:
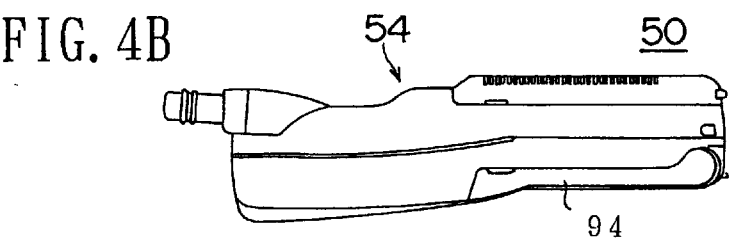
Figure 4C:
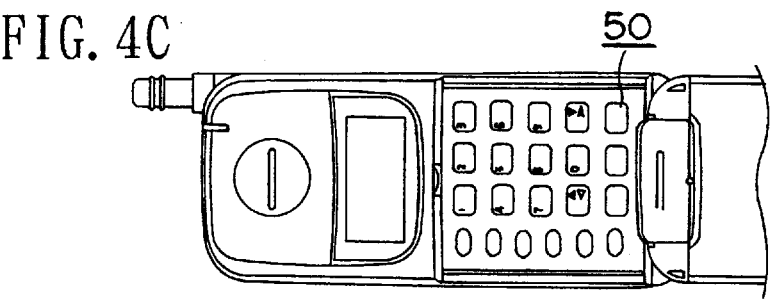
Figure 4D:
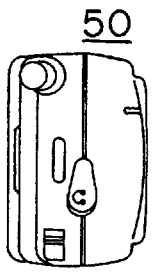
Figure 4E:
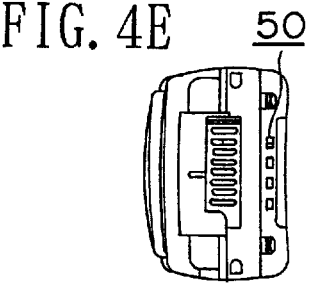
Figure 4F:
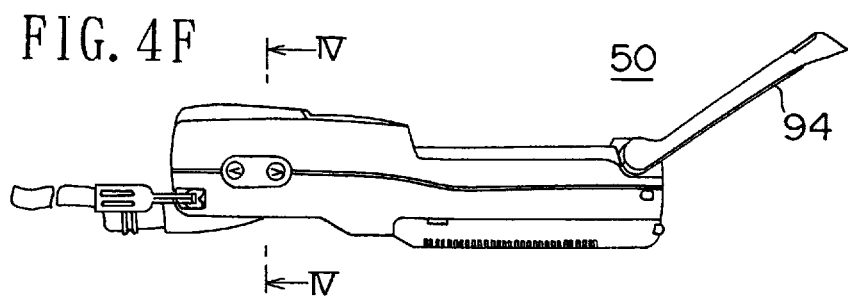
Figure 5:
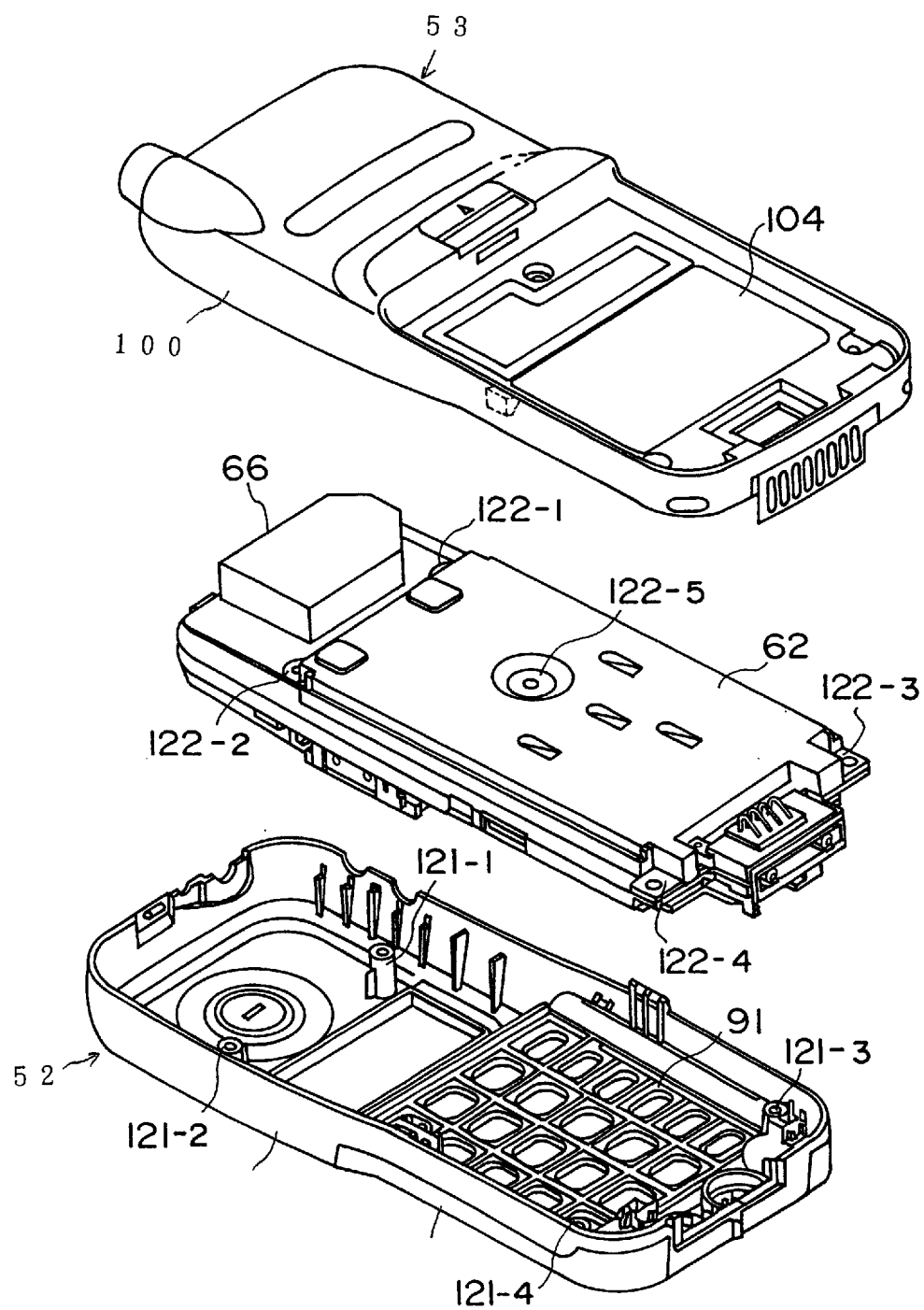
FIG. 5 is an exploded perspective view showing a structure of the portable telephone.
Figure 6:
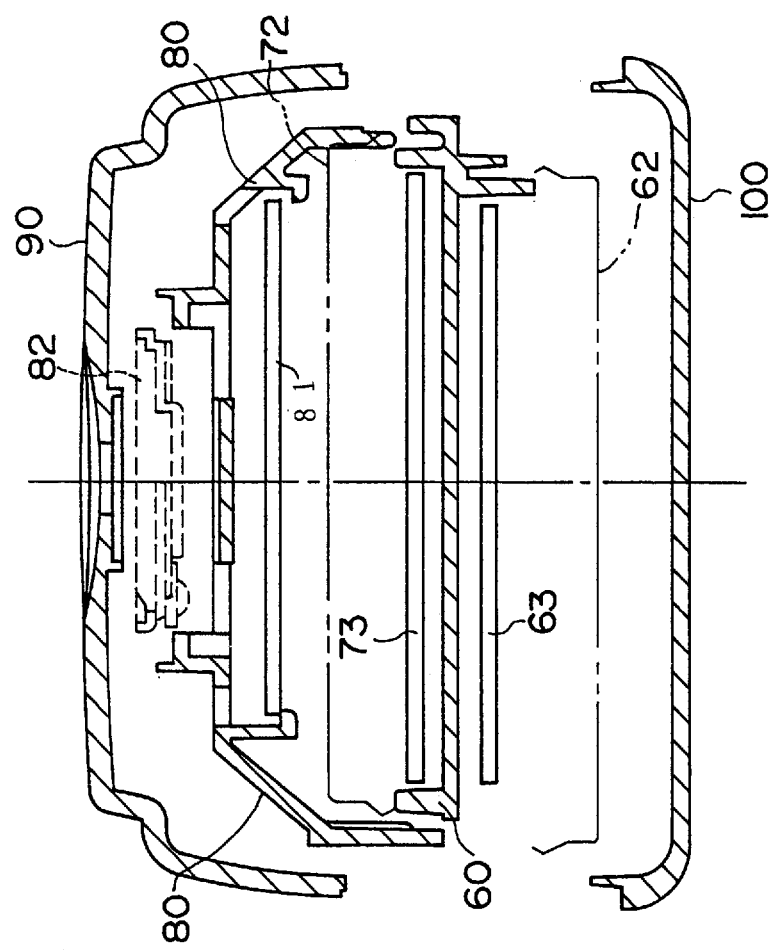
FIG. 6 is a cross sectional view taken along line IV—IV shown in FIG. 4F.

A description will be given of an embodiment of the present invention. FIGS. 3, 5 and 6 show a structure of a personal telephone according to the embodiment of the present invention, and FIGS. 4A—4F show exterior views of the personal telephone.

Figure 7:
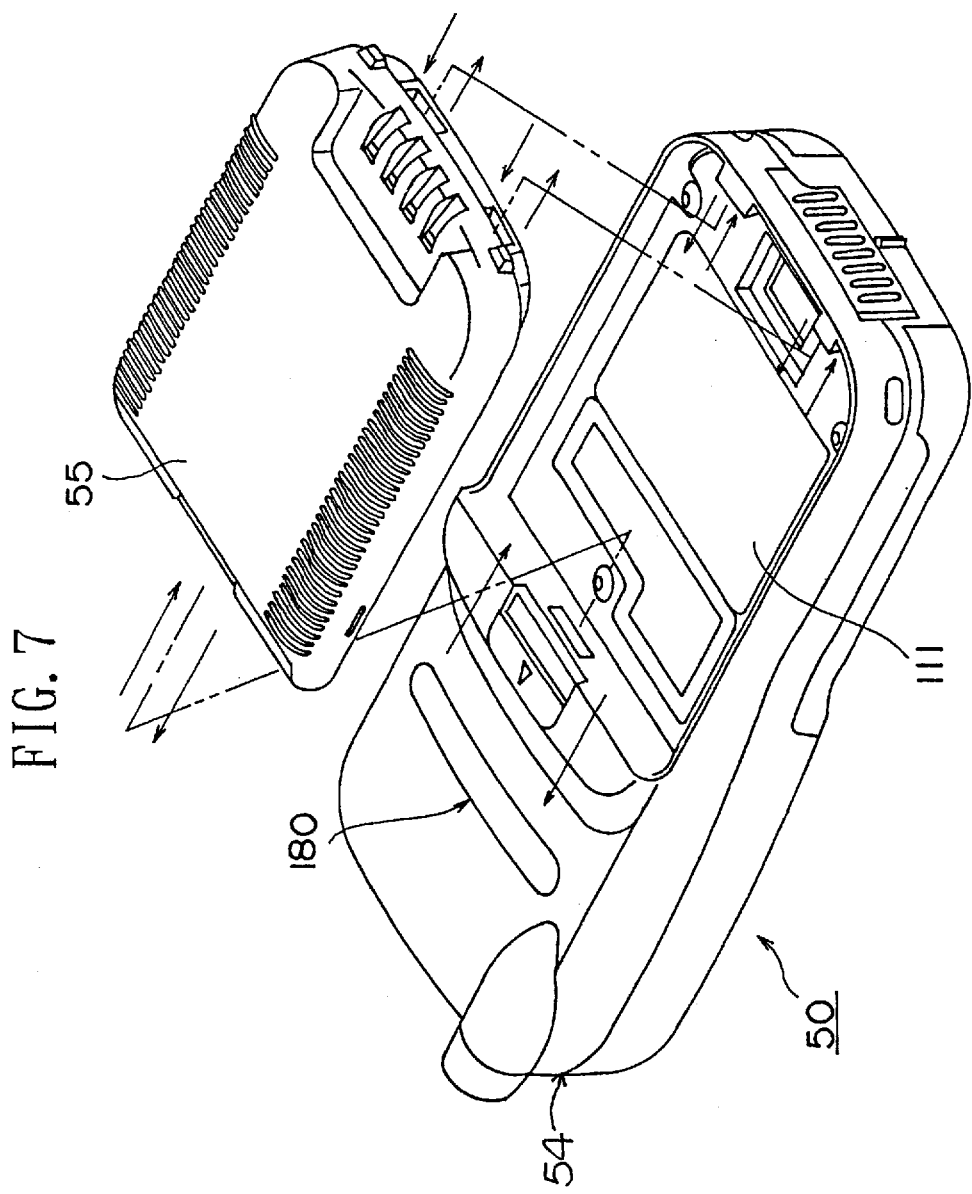
FIG. 7 is an perspective view showing a rear side of the portable telephone.

A portable telephone 50 has a telephone body assembly 51, a front case assembly 52 and a rear case assembly 53. The telephone body assembly 51 is housed in a case 54 formed of the combination of the front case assembly 52 and the rear case assembly 53. A battery 55 is detachably mounted, as shown in FIG. 7, on a rear surface of the case 54.

A general description will now be given of structures of the telephone body assembly 51, the front case assembly 52 and the rear case assembly 53.

[Telephone Body Assembly 51]

Figure 8:
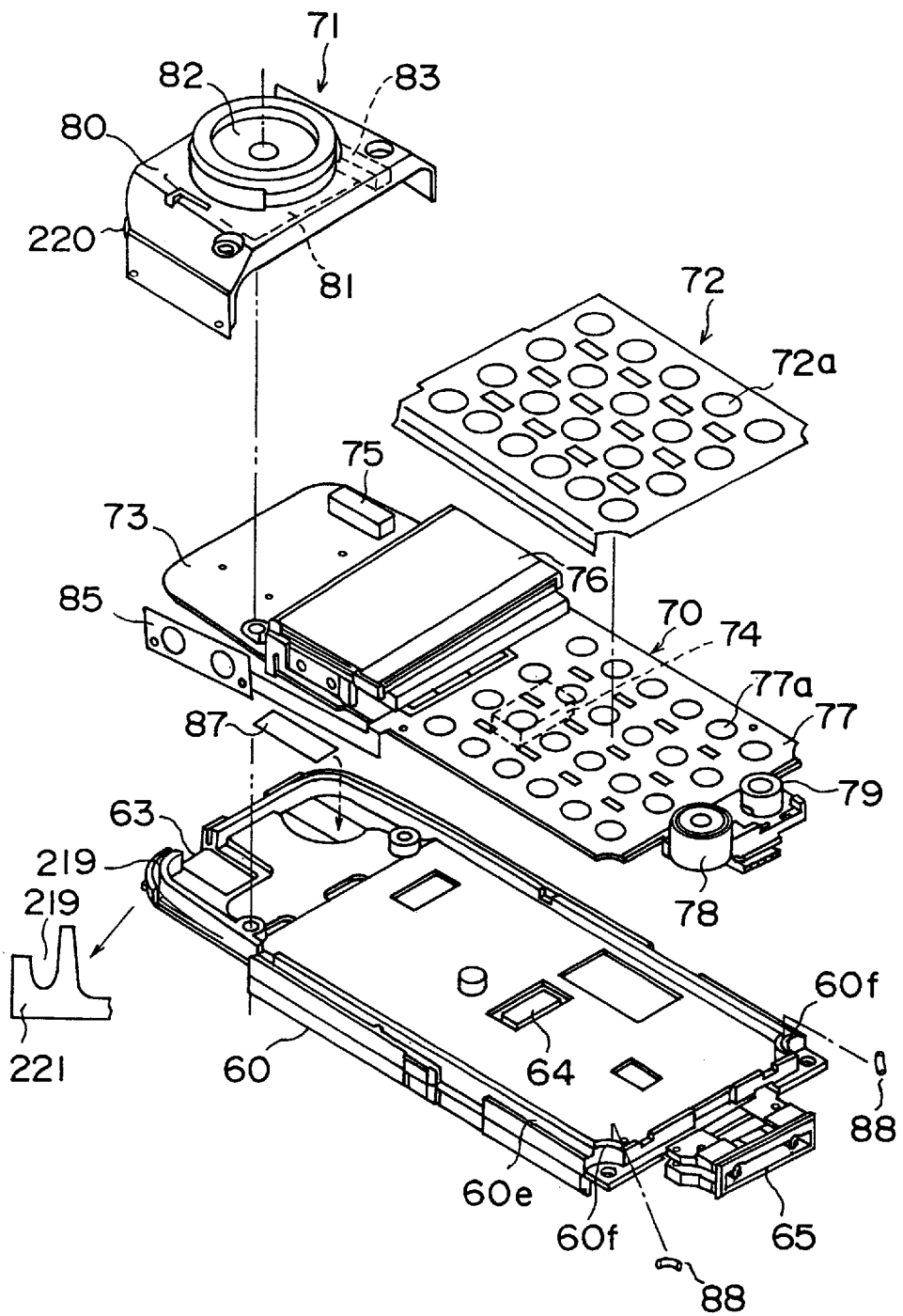
FIG. 8 is an exploded perspective view showing a telephone body assembly of the portable telephone.
Figure 9:
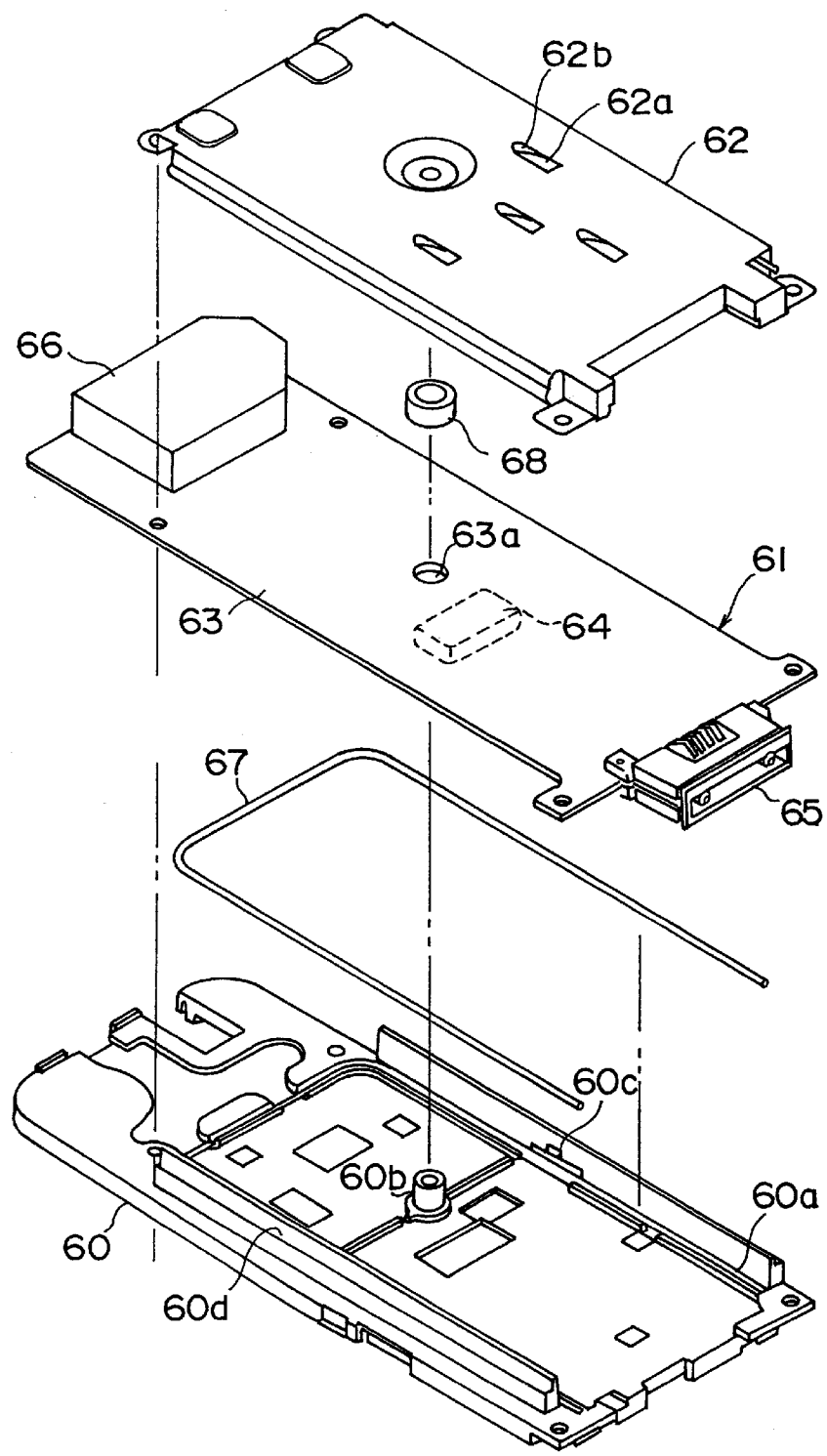
FIG. 9 is an exploded perspective view showing a structure in which a chassis and a printed-circuit board are assembled.

(See FIGS. 8 and 9)

The telephone body assembly 51 has, as shown in FIGS. 8 and 9, a chassis 60 made of plastic which is plated with metal. As shown in FIG. 9, a first printed-circuit board assembly 61 (TU), a shield plate 62 and a rubber tube 67 coated with a conductive shield material are mounted on the under surface of the chassis 60. The rubber tube 67 may be rubber including a wire made of a shield material and a conductive filler. The rubber tube 67 is pushed in a U-shaped groove 60a. The first printed-circuit board assembly 61 has a first printed-circuit board 63 on which a plurality of IC parts (not shown), connectors 64 and 65 and an internal antenna 66 are mounted. A hole 63a is formed on a center portion of the first printed-circuit board 63. A boss 60b projecting from the chassis 60 is fitted in the hole 63a of the first printed-circuit board 63 so that the first printed-circuit board assembly 61 is positioned on the chassis 60. Side edges of the first printed-circuit board 63 are then engaged with clicks 60c so that the first printed-circuit board assembly 61 is mounted on the chassis 60. A spacer 68 plated with metal is fit in the boss 60b so that a space between the shield plate 62 and the printed-circuit board 63 is maintained.

Both side edge portions of the shield plate 62 are elastically pushed in groove portions 60d formed on the chassis 60 so that the shield plate 62 is mounted on the chassis 60 under a condition in which electric connection of the shield plate 62 and the chassis 60 is secure. The shield plate 62 has U-shaped slits formed at predetermined positions so that cut raising pieces 62a and openings 62b are formed on the shield plate 62. In a state where the shield plate 62 is mounted on the chassis 60, the cut raising pieces 62a are elastically in contact with large IC parts on the printed-circuit broad 63. Thus, heat can be easily radiated from the large IC parts. In addition, the large IC parts are directly grounded, so that noises generated in the large IC parts hardly leak out from the telephone body assembly 51.

A second printed-circuit board assembly 70 (LOG), a loudspeaker assembly 71 and a shield plate 72 are mounted on the upper surface of the chassis 60 as shown in FIG. 8.

The second printed-circuit board assembly 70 has a second printed-circuit board 73. A connector 74 is mounted on the under surface of the second printed-circuit board 73. A connector 75, a liquid crystal display module 76, a keyboard 77, an alert 78, a microphone 79 and other parts are mounted on the upper surface of the second printed-circuit board 73.

The loudspeaker assembly 71 has a holder 80 which is plated with metal. A third printed-circuit board assembly 81 is mounted in the holder 80 and a loudspeaker 82 is mounted on the holder 80. A connector 83 mounted on the third printed-circuit board assembly 81 is connected to the connector 75.

The shield plate 72 has openings 72a corresponding to key switches 77a of the keyboard 77. Both side edge portions of the shield plate 72 are pushed in groove portions 60e of the chassis 60 so that the shield plate 72 covers the keyboard 77.

A key switch 85 is positioned on a side surface of the holder 80 and is adhered thereto. In addition, an insulating sheet 87 is adhered to the chassis 60. A rubber tube 88 coated with a conductive shield material is pushed in a U-shaped groove 60f of the chassis 60.

As is clear from the above description, the telephone body assembly 51 has a structure for shielding itself. In addition, the first printed-circuit board assembly 61 and the second printed-circuit board assembly 71 are electrically connected by the connection of the connectors 64 and 74. The third printed-circuit board assembly is electrically connected to the second printed-circuit board assembly 70 via the connectors 83 and 75. Thus, due to connection of an external power supply to the connector 65, all the printed-circuit board assemblies 61, 70 and 81 are activated.

Front Case Assembly 52

Figure 10:
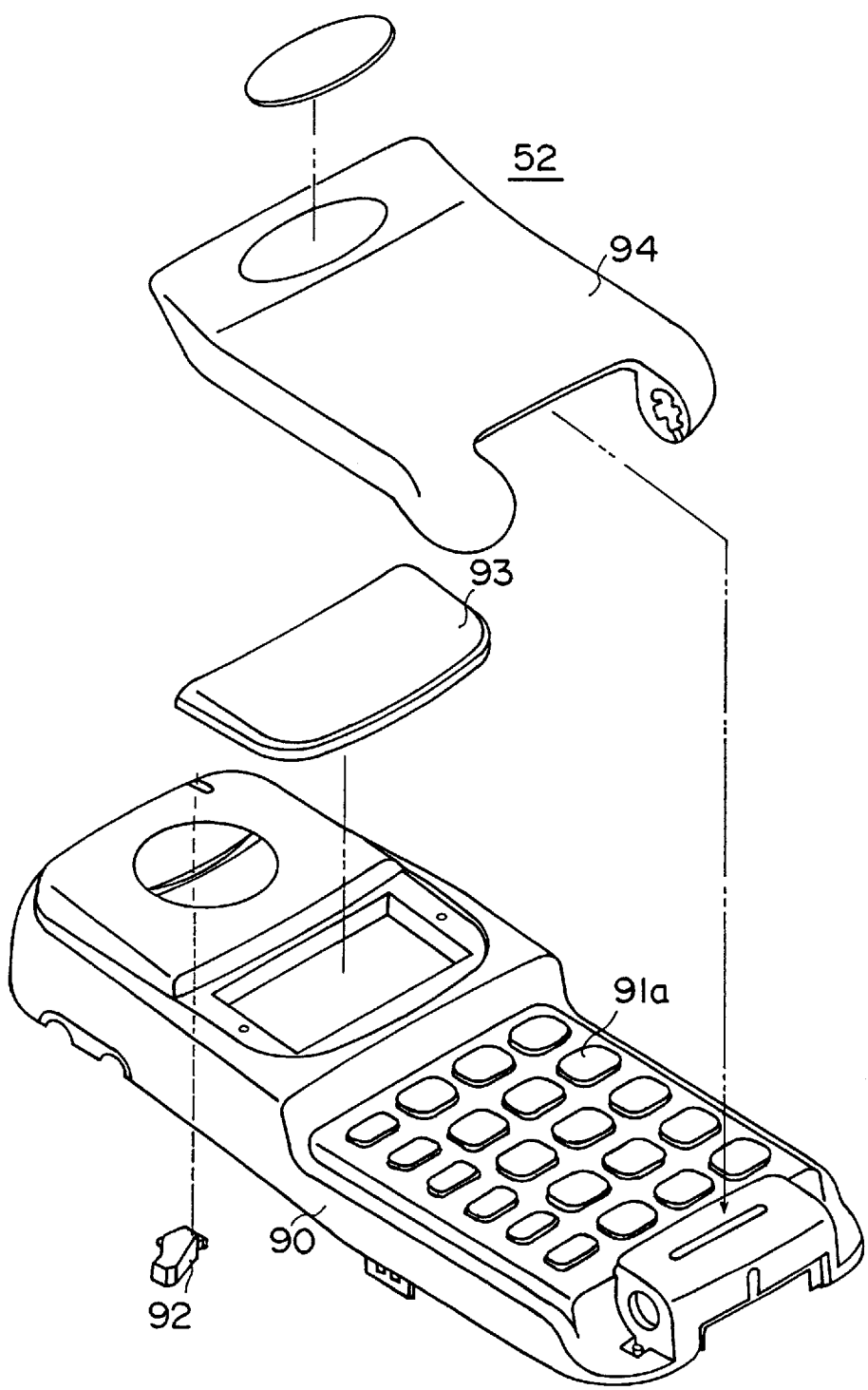
FIG. 10 is an exploded perspective view showing a front case assembly.

(See Mainly FIG. 10)

As shown in FIGS. 3, 5 and 10, the front case assembly 52 has a front case body 90 made of plastic on which keypads 91, a lamp 92 for indicating a calling, a display window 93 and a lid 94. The lid 94 can be opened and closed, and can be maintained at a closing position at which the lid 94 covers the keys 91a as shown in FIG. 3 and at an opening position as shown in FIG. 4F.

Rear Case Assembly 53

Figure 11:
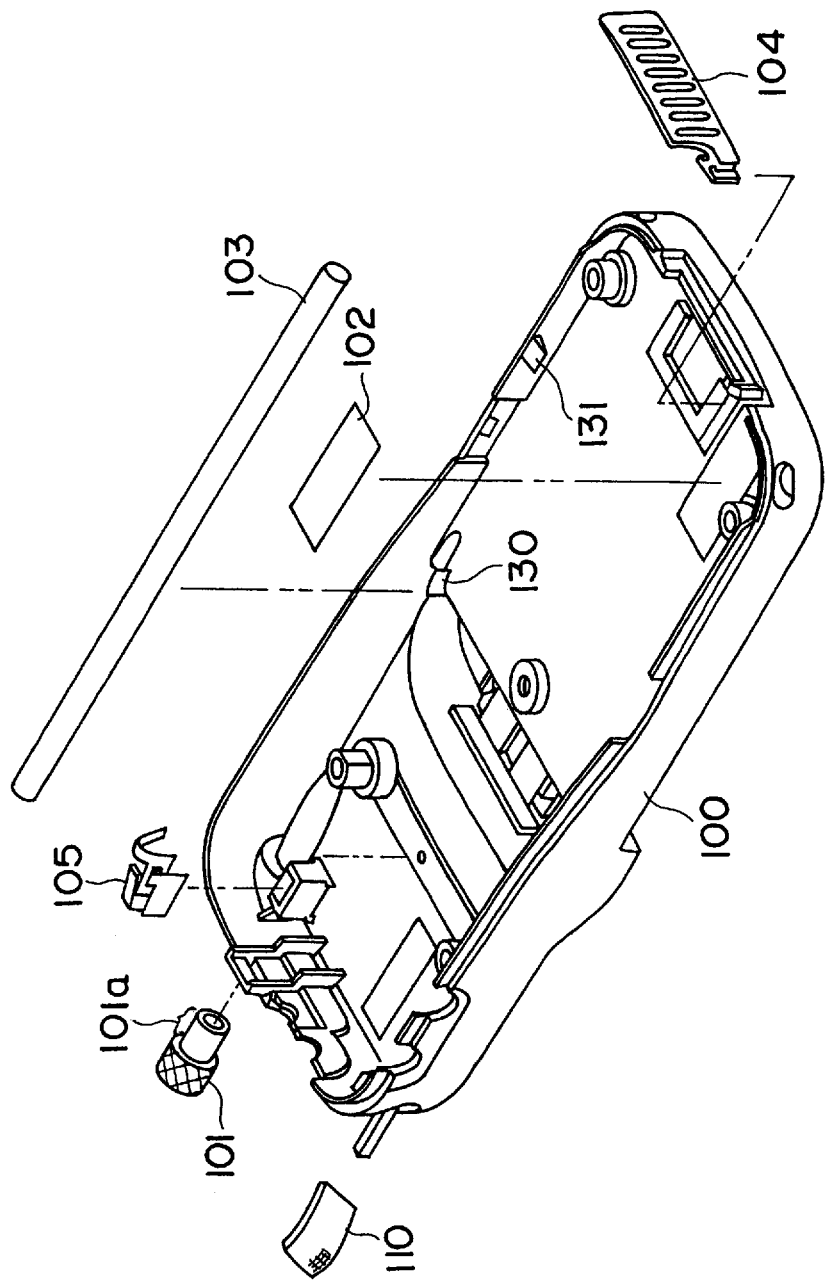
FIG. 11 is a perspective view showing an inner structure of the front case assembly.
Figure 12:
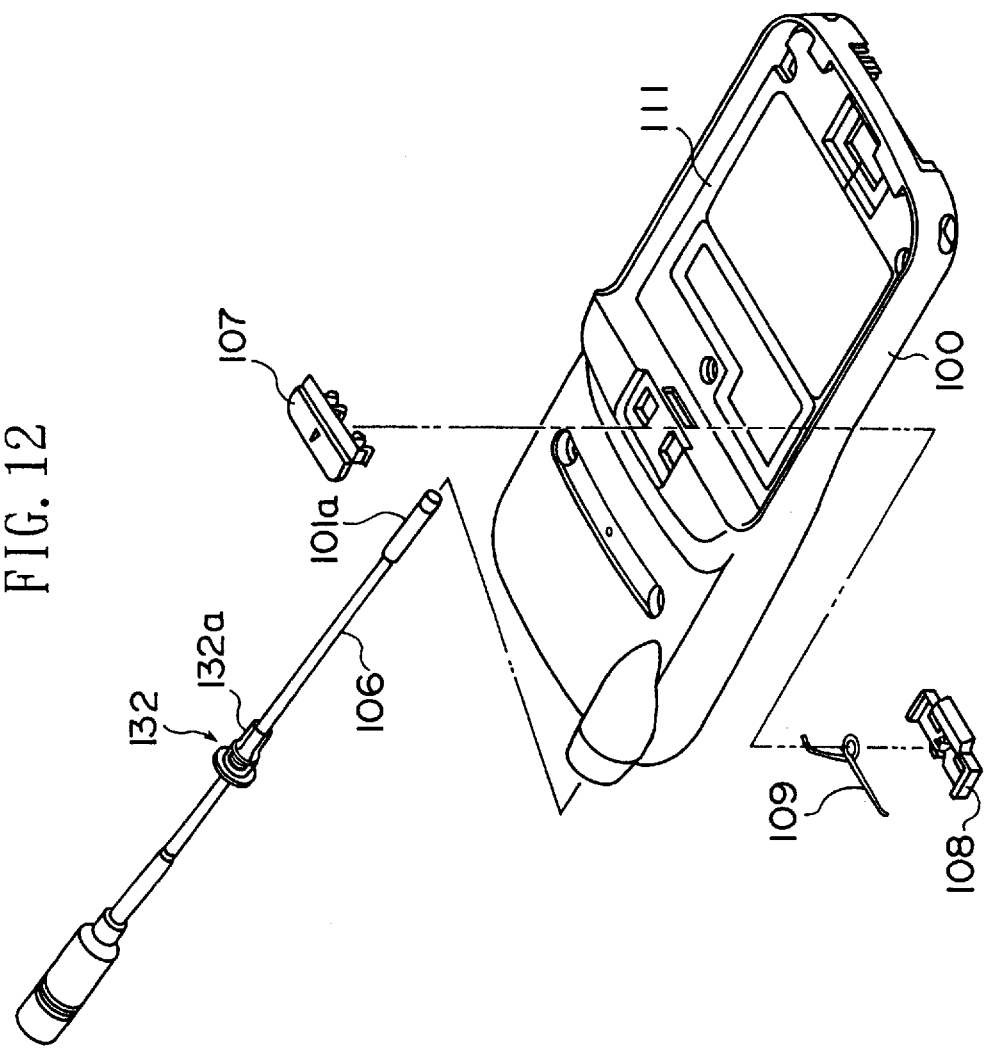
FIG. 12 is an exploded perspective view showing a rear side of a rear case assembly.

(Mainly See FIGS. 11 and 12)

As shown in FIG. 11, the rear case assembly 53 has a rear case body 100 made of plastic in which a pipe 103, a cap 104, a leaf spring 105 for an antenna electric contact and a strap 110. A sleeve 101 is pressed in the rear case body 100, and a seal 102 is provided in the rear case body 100. As shown in FIG. 12, an antenna 106 is screwed in the rear case body 100. A release button 107, a lock click 108 and a spring 109 are mounted on the rear case body 100 so that the rear case body 100 is sandwiched by the release button 107 and the lock click 108. The rear case body 100 has a battery mounting portion 111.

[Assembling Method of the Portable Telephone]

A description will now be given of an assembling method of the portable telephone 50 in which the telephone body assembly 51, the front case assembly 52 and the rear case assembly 53 are assembled.

First, a mechanism for positioning the telephone body assembly 51 in the case 54 will be described below.

As shown in FIG. 3, bosses $120_{-1}$–$120_{-5}$ are formed on an inner surface of the rear case body 100. As shown in FIG. 5, bosses $121_{-1}$–$121_{-4}$ are formed on an inner surface of the front case body 90 at positions corresponding to the bosses $120_{-1}$–$120_{-4}$. The under surface of the telephone body assembly 51 is provided, as shown in FIG. 5, with contact portions $122_{-1}$–$122_{-5}$ corresponding to the bosses $120_{-1}$–$120_{-5}$. The upper surface of the telephone body assembly 51 is provided, as shown in FIG. 3, with contact portions $123_{-1}$–$123_{-4}$ corresponding to the bosses $121_{-1}$–$121_{-4}$.

The portable telephone 50 having the above structures is assembled in accordance with the following procedure.

1) The telephone body assembly 51, the front case assembly 52 and the rear case assembly 53 are each previously assembled.

The telephone body assembly 51 is connected to the external power supply, and the performance testing of the telephone body assembly 51 is carried out. That is, all electrical characteristics in the transmitting/receiving operations of the telephone body assembly 51 are confirmed. As a result, non-defective telephone body assemblies are prepared.

Since the performance testing is carried out under a condition in which the telephone body assembly 51 is not mounted in the case 54, it is easy to do the testing works. In addition, since all parts are assembled by using engagement and friction, it is easy to do repair work.

2) The front case assembly 52 is set on a work table.

3) The telephone body assembly 51 is turned upside down, and is set in the front case assembly 52 so that the contact portions $123_{-1}$–$123_{-4}$ come into contact with the bosses $121_{-1}$–$121_{-4}$ of the front case assembly 52. At this time, a volume key 86 and the keypad 91 are mounted in the front body assembly 52.

4) The rear case assembly 53 covers the telephone body assembly 51 so that the bosses $120_{-1}$–$120_{-5}$ are in contact with the contact portions $122_{-1}$–$122_{-5}$ of the telephone body assembly 51. The rear case body 100 and the front case body 90 are provisionally engaged with each other by clicks.

5) Screws $124_{-1}$–$124_{-5}$ are respectively inserted in the bosses $120_{-1}$–$120_{-5}$, as shown in FIG. 3, and tightened. Thus, the rear case assembly 53 and the front case assembly 52 are fixed onto each other, the telephone body assembly 51 is fixed in the front case assembly 52, and four corner portions of the telephone body assembly 51 are sandwiched by the rear case assembly 53 and the front case assembly 52 so as to be fixed in place.

6) Since the performance testing for the telephone body assembly 51 has been carried out already, the performance testing does not have to be carried out for the portable telephone 50 after it is completely assembled.

The portable telephone 50 having the above structure has the following features.

1) Although the shield plates 62 and 72 have to be provided, the aluminum evaporation films are not formed on the front case body 90 and rear case body 100. Thus, the total production cost of the portable telephone 50 can be decreased.

2) It is not necessary to carry out the performance testing after the portable telephone is completely assembled. Thus, the number of works which should be done after the portable telephone is assembled is decreased. As a result, there is less possibility that the front case body 90 and/or the rear case body 100 will be damaged than in the case of the conventional art.

A description will now be given of structures of respective parts of the portable telephone.

Antenna Unit (See FIG. 1 and FIGS. 11–19)

Figure 13:
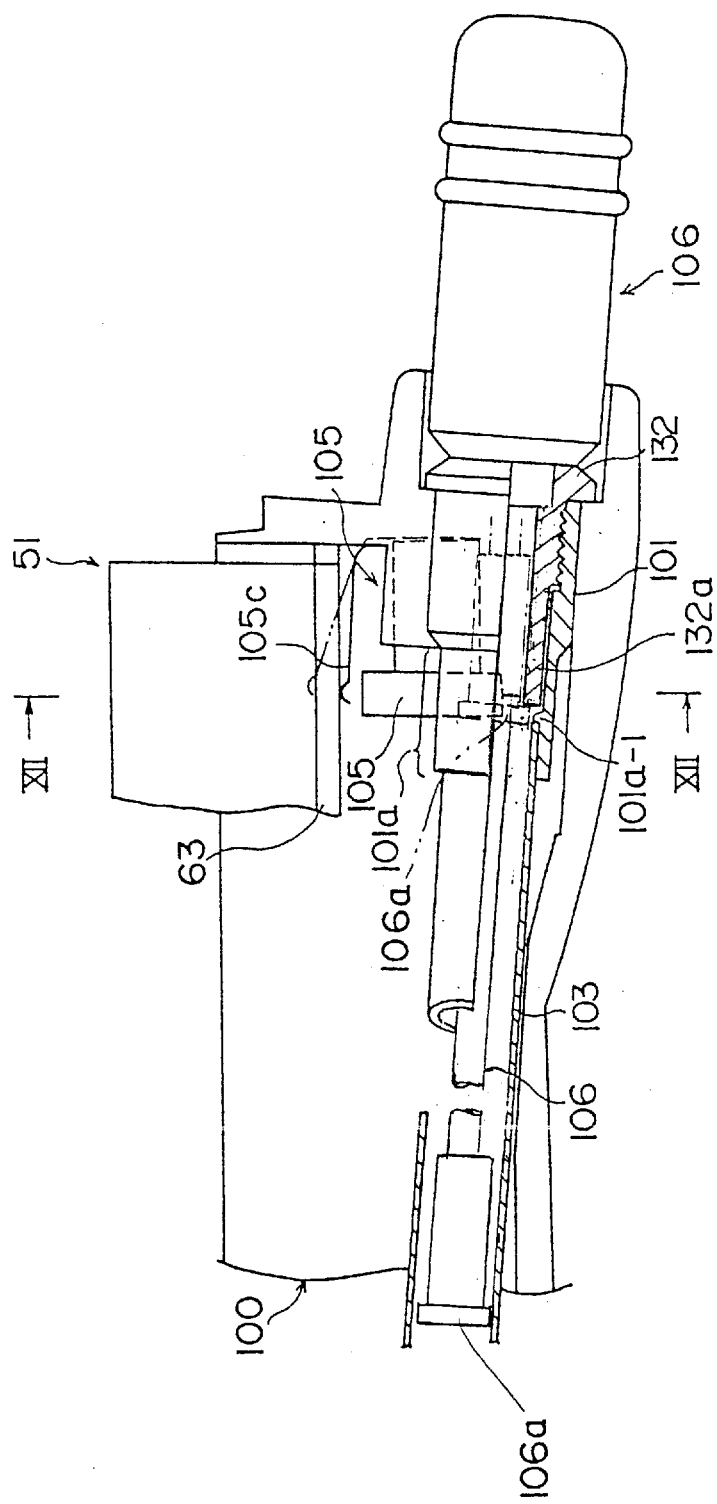
FIG. 13 is a cross sectional view showing an antenna unit.

As shown in FIGS. 11 and 13, the sleeve 101 is longer than a normal one, and a minor diameter portion 101a of the sleeve 101 projects inside the rear case body 100. A flange $101a_{-1}$ is formed in the minor diameter portion 101a of the sleeve 101. The pipe 103 is inserted in the minor diameter portion $101a_{-1}$ of the sleeve 101 so that an end of the pipe 103 hits on the flange $101a_{-1}$. A center portion of the pipe 103 is pressed by a rib 130, and another end of the pipe 103 is engaged with a click 131. The pipe 103 is mounted in the rear case body 100 so as to be positioned along a side wall of the rear case body 100. A holder member 132 fitted on the antenna 106 is inserted in the sleeve 101 and fixed in the sleeve 101 by screws. The holder member 132 has a clamping portion 132a which is slit.

Figure 14:
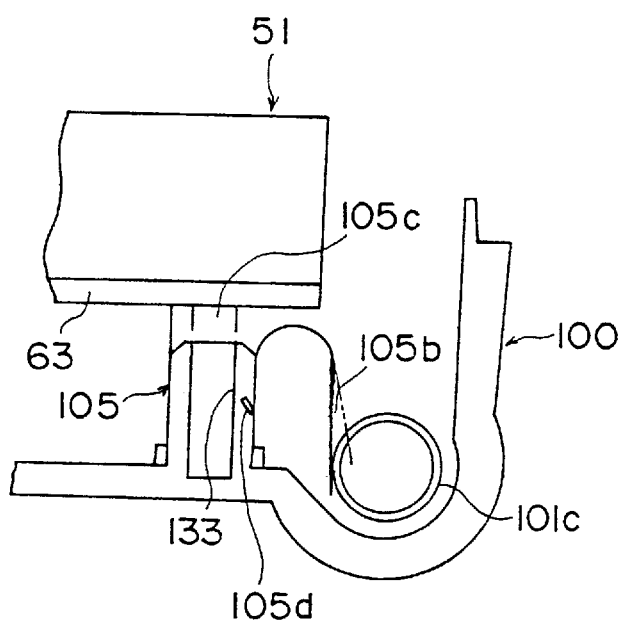
FIG. 14 is a cross sectional view taken along line XII—XII shown in FIG. 13.
Figure 15:
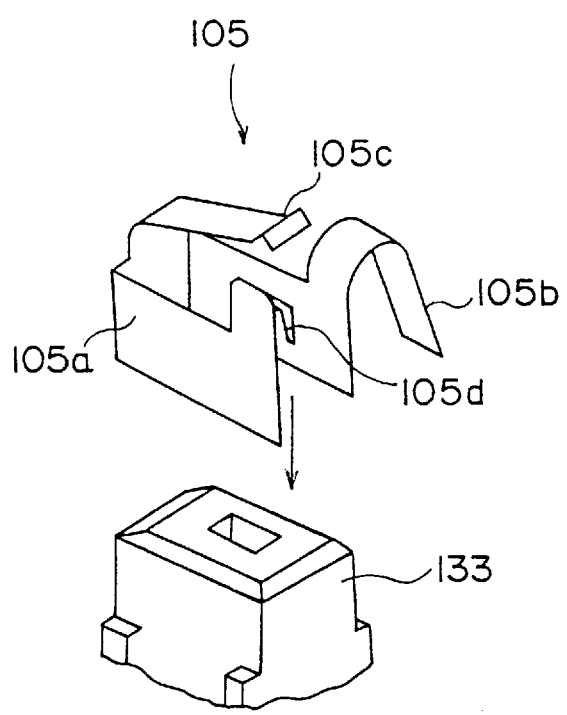
FIG. 15 is a perspective view showing a leaf spring member for an antenna contact.

As shown in FIG. 15, the leaf spring member 105 for the antenna electrical contact has a U-shaped body 105a, a first leaf spring portion 105b extending sideward from the U-shaped body 105a, a second leaf spring portion 105c extending upward from the U-shaped body 105a and a cut raising portion 105d formed on the U-shaped body 105a. The U-shaped body 105a is fitted on a projection portion 133 of the rear case body 100 and is prevented from being removed from the projection portion 133 by the cut raising portion 105d, so that the leaf spring member is mounted on the projection portion 133 of the rear case body 100. As shown in FIG. 14, the first leaf spring portion 105b presses the minor diameter portion 101a of the sleeve 101, and the second leaf spring portion 105c presses a circuit pattern of the printed-circuit board 63 of the telephone body assembly 51.

When the antenna 106 is pulled out, an end portion 106a of the antenna 106 enters in the clamping portion 132a of the holder member 132 so as to be clamped. As a result, the antenna 106 is electrically connected to an antenna circuit via the end portion 106a, the holder member 132, the sleeve 101 and the leaf spring member 105.

Figure 16:
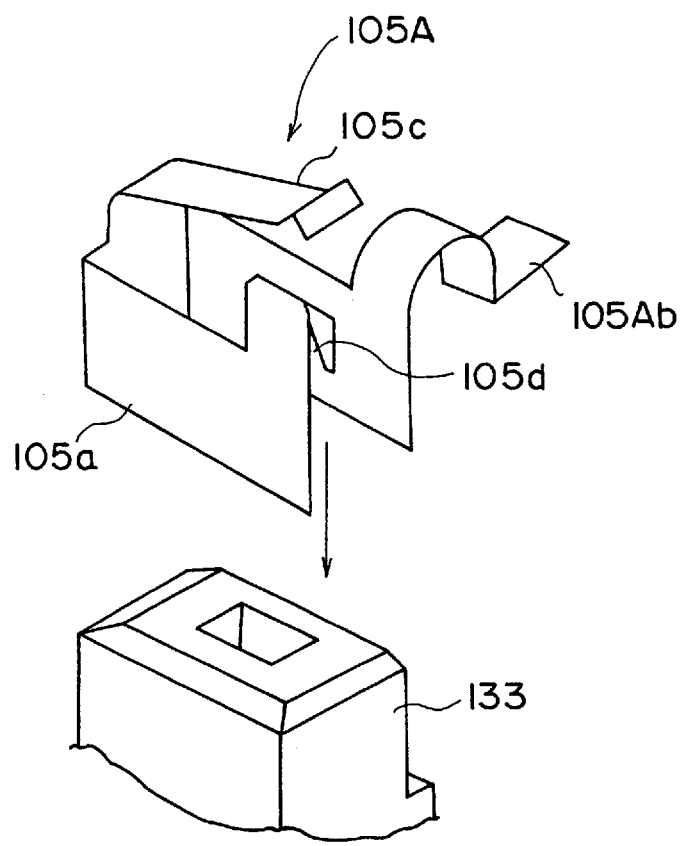
FIG. 16 is a perspective view showing a first modification of the leaf spring member for the antenna contact.
Figure 17:
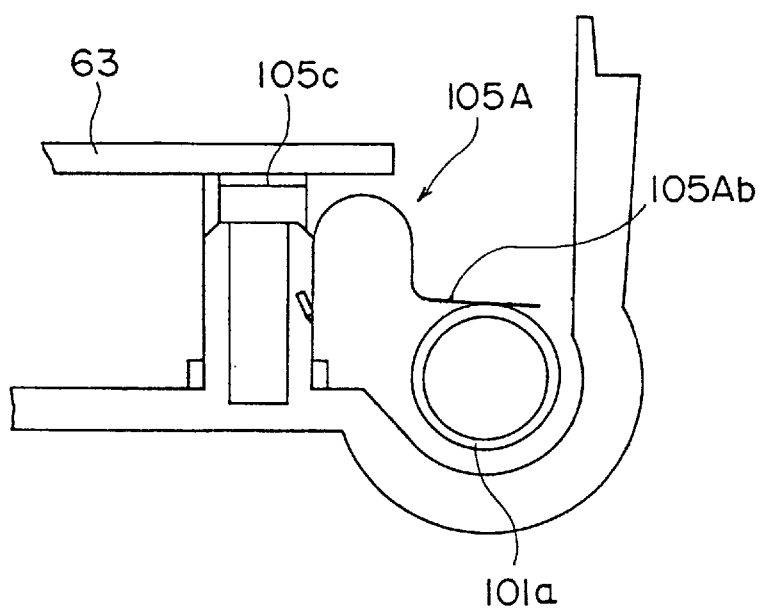
FIG. 17 is a diagram illustrating a structure in which the leaf spring member shown in FIG. 16 is mounted in the case.

FIGS. 16 and 17 show a first modification of the leaf spring member.

The leaf spring member 105A shown in FIGS. 16 and 17 has the same structure as that shown in FIG. 15, except for the first leaf spring portion 105b. The first leaf spring portion 105Ab of the leaf spring member 105A in this modification has a horizontal part. The first spring portion 105Ab of the leaf spring member 105A is in contact with the surface of the minor diameter portion 101a of the sleeve 101 as shown in FIG. 17.

Figure 18:
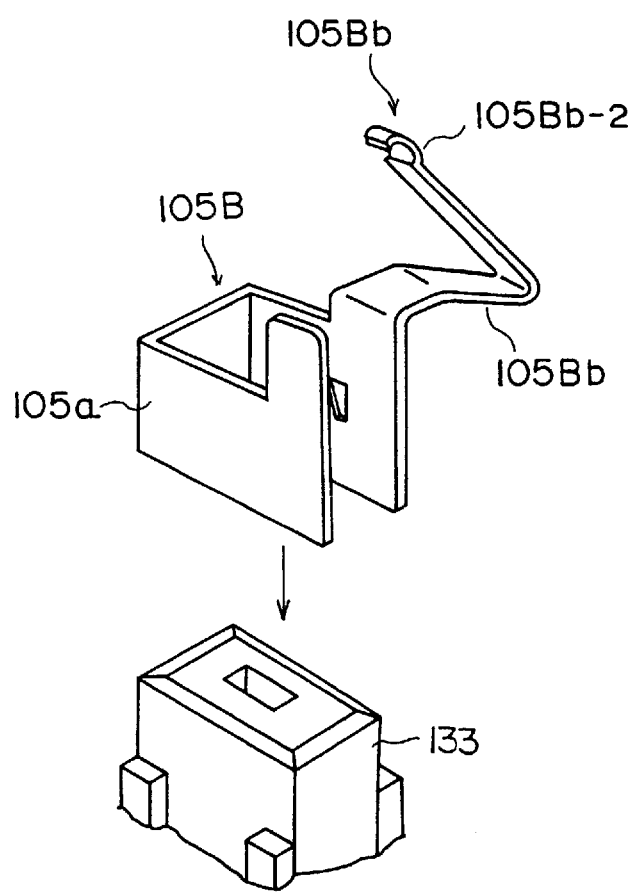
FIG. 18 is a perspective view showing a second modification of the leaf spring member for the antenna contact.
Figure 19:
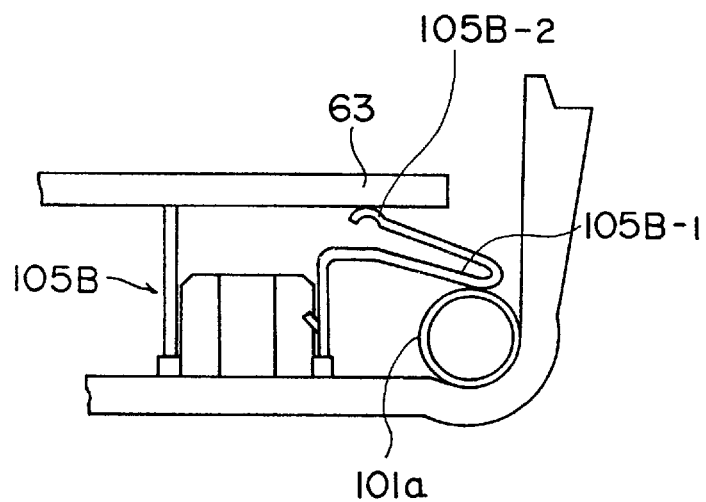
FIG. 19 is a diagram illustrating a structure in which the leaf spring shown in FIG. 18 is mounted in the case.

FIGS. 18 and 19 show a second modification of the leaf spring member.

The leaf spring member 105B shown in FIGS. 18 and 19 has a part corresponding to the second leaf spring portion 105c of the leaf spring member 105 shown in FIG. 15, but in addition has a leaf spring portion 105Bb. The leaf spring portion 105Bb is bent so as to be V-shaped, and has a first part $105Bb_{-1}$, and a second part $105Bb_{-2}$. As shown in FIG. 19, the second part $105Bb_{-2}$ of the leaf spring portion 105Bb is in contact with the printed-circuit board 63 and the first part $105Bb_{-1}$ is in contact with the minor diameter portion 101a of the surface of the sleeve 101.

Structure 139 for Pivotably Supporting Lid 94

(Mainly See FIGS. 20–25B)

Figure 20:
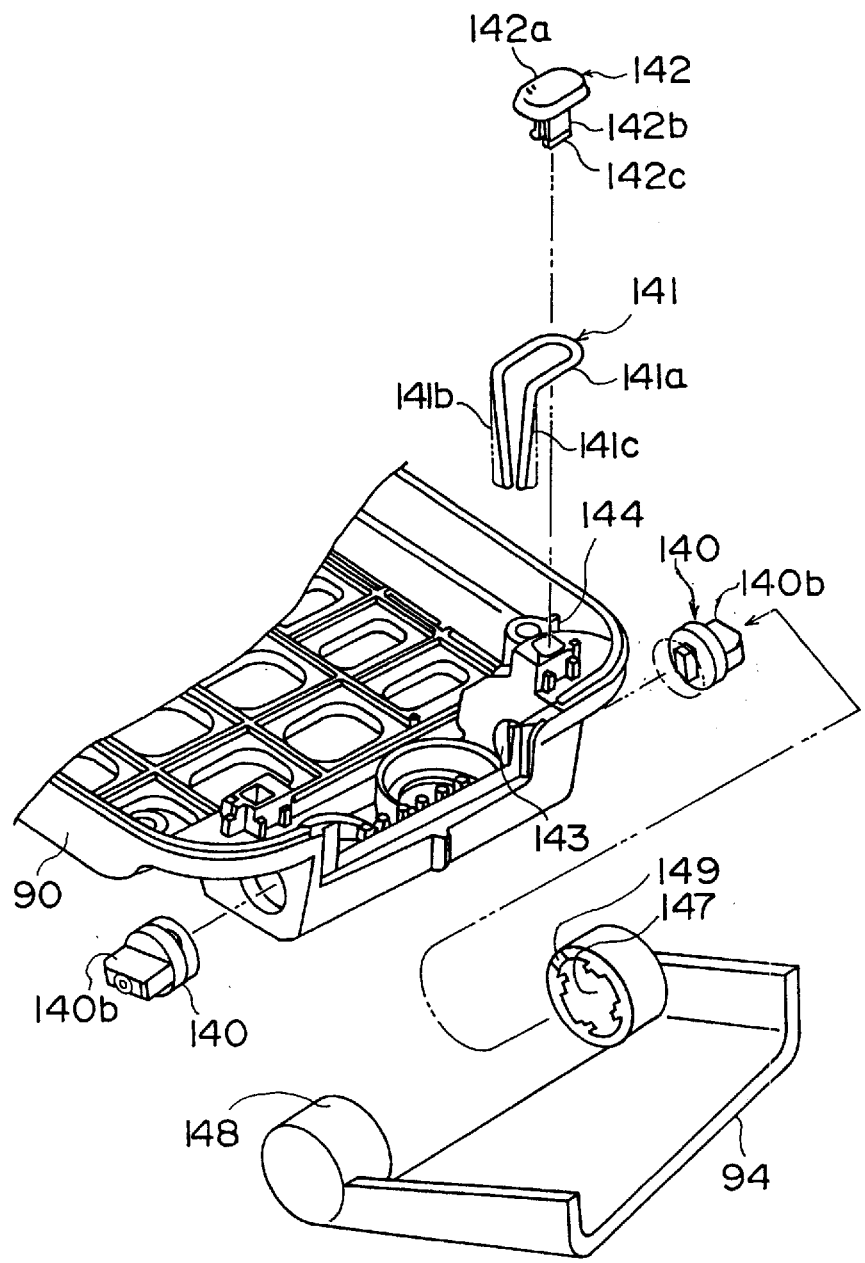
FIG. 20 is an exploded perspective view showing a pivotally supporting structure of a lid.
Figure 23:
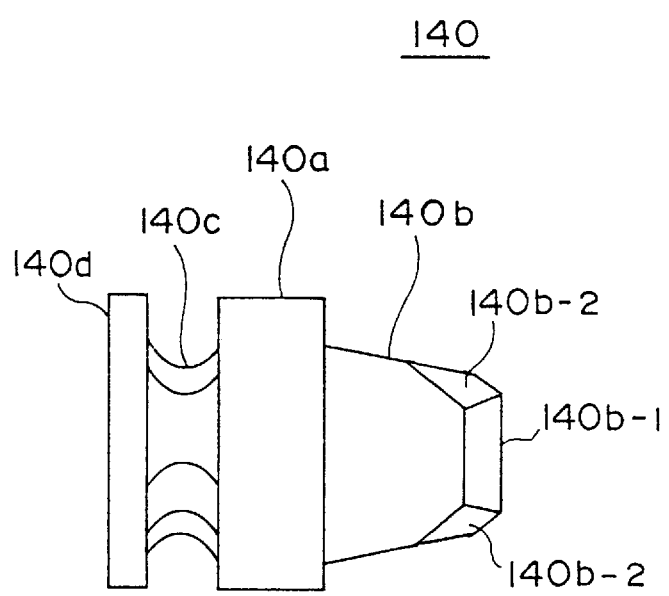
FIG. 23 is an enlarged diagram illustrating a shaft member.

As shown in FIGS. 20 and 23, a shaft member 140 has a cylindrical shaft portion 140a, a rectangular shaft portion 140b projecting from a side of the cylindrical shaft portion 140a, a shaft portion 140c projecting from a side of the cylindrical shaft portion 140a opposite to the side of the rectangular shaft portion 140b and a flange portion 140d formed at an end of the shaft portion 140c. The rectangular shaft portion 140b has a rectangular section, and the shaft portion 140c has an octagonal section. The rectangular shaft portion 140b and the shaft member 140c are arranged so as to be perpendicular to each other. To easily mount the shaft portion 140 on the lid 94, the shaft portion 140c having the octagonal section has an arc-shaped end portion $140b_{-1}$ and a taper portion $140b_{-2}$.

A spring member 141 has a U-shaped portion 141a and a set of arm portions 141b and 141c bent at the end of the U-shaped portion 141a to be tapered. A cap member 142 has a cap 142a, a forked projection 142b and a click 142c formed at the end of the forked projection 142b.

Figure 21:
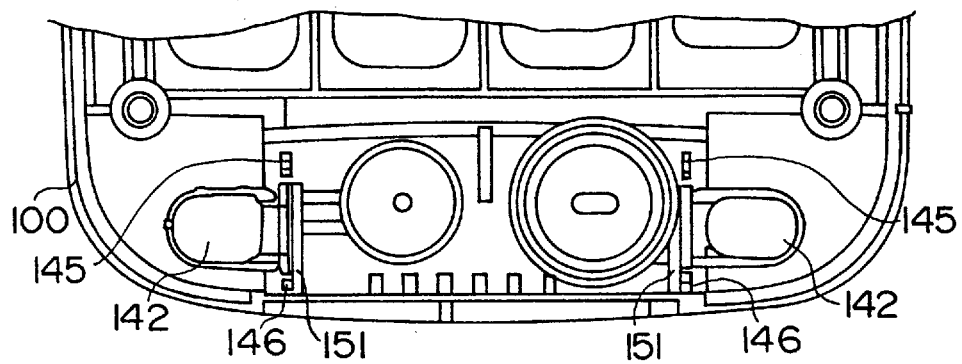
FIG. 21 is a plan view showing the pivotally supporting structure of the lid.
Figure 22:
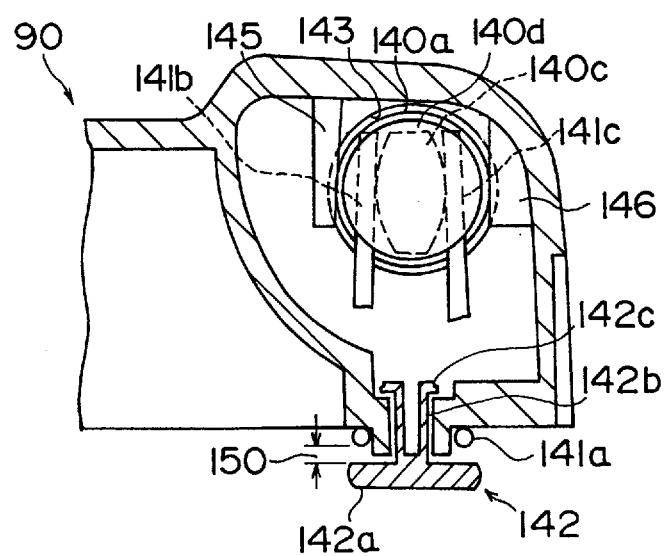
FIG. 22 is a diagram illustrating the pivotally supporting structure of the lid.

The cylindrical shaft portion 140a of the shaft member 140 is rotatably fitted in a hole 143 of the front case body 90. As shown in FIGS. 21 and 22, the forked projection 142b of the cap member 142 is inserted in a hole 144 of the front case body 90 and the click 142c is engaged with the end rim of the hole 144. The U-shaped portion 141a of the spring member 141 is pressed by the cap 142a of the cap member 142 so that the spring member 141 is mounted at a position of the hole 144. The set of arm portions 141b and 141c of the spring member 141 catches the shaft portion 140c of the shaft member 140. The flange 140d of the shaft member 140 is sandwiched between ribs 145 and 146, and the shaft member 140 is prevented by the ribs 145 and 146 from being pulled out from the hole 143.

In a state where the shaft member is mounted in the hole 143, the rectangular shaft portion 140b of the shaft member 140 projects from the front case member 90. The shaft member 140 is mounted on each of right and left sides of the front case body 90. The lid 94 has shaft engage portions 147 and 148 formed at right and left sides thereof. Each of the engage portions 147 and the 148 of the lid 94 is engaged with the rectangular shaft portions 140b of the shaft member 140 so that the lid 94 is mounted on the front case body 90.

When an open/close operation of the lid 94 is performed, the shaft member 140 is rotated along with the lid 94. As shown in FIGS. 24A, 24B and 24C, in a state where the shaft portion 140c having the octagonal section expands the distance between the arm portions 141b and 141c of the spring member 141 and the deviation of the shaft member 140 is prevented by the ribs 145 and 146, the shaft member 140 is rotated.

FIG. 24A shows a state in which the lid 94 is closed. The lid 94 is stressed by a spring force applied to the shaft portion 140c by the spring member 141 in a counterclockwise direction so that the lid 94 is closed.

When the lid 94 is rotated so as to be opened, as shown in FIG. 24B, the shaft portion 140 having the octagonal section expands the distance between the arm portions 141b and 141c of the spring member 141. After this, the distance between the arm portions 141b and 141c of the spring member 141 is narrowed. As a result, the lid 94 is, as shown in FIG. 24C, elastically maintained at an opening position.

The above described structure 139 for pivotally supporting the lid 94 has the following features.

I. Assembling work is easy.

The assembling work is performed in accordance with the following procedure.

1) The shaft member 140 is inserted in the hole 134.

2) The spring member 141 is engaged with the shaft portion 140c so that as to be mounted in the front case body 90. By an operation in which the spring member 141 is engaged with the shaft portion 140c of the shaft member 140, the shaft member 140 is maintained at a position as shown in FIG. 24C. Thus, the distance between the arm portions 141b and 141c of the spring member 141 are not greatly expanded, so that the spring member 141 can be smoothly engaged with the shaft member 140.

3) The cap member 142 is inserted in the hole 144 so as to be mounted in the front case body 90.

4) Last, the lid 94 is mounted on the shaft member 140.

Figure 25A:
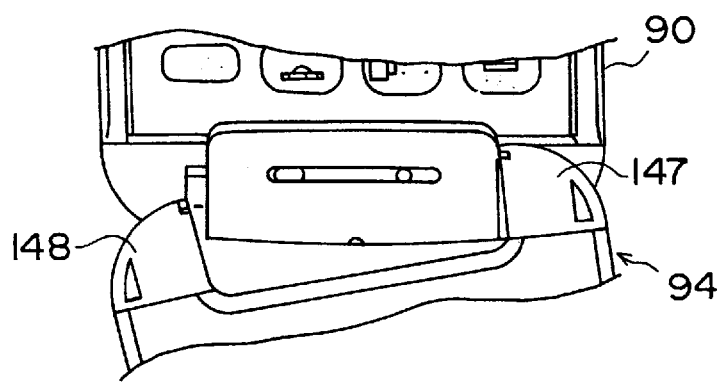
FIGS. 25A and 25B are diagrams illustrating an attachment of the lid to the case.
Figure 25B:
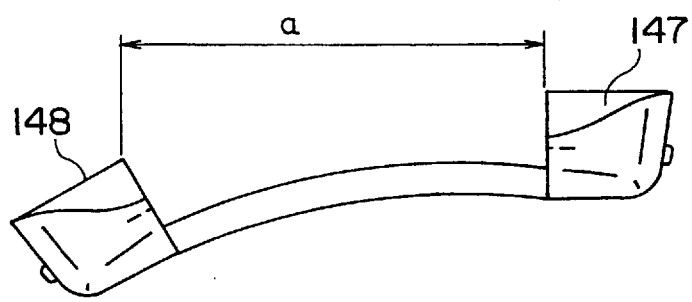

At the opening position, as shown in FIG. 25A, the lid 94 is engaged with the rectangular shaft portion 140b of the shaft member 140 provided at a first side of the front case body 90. In this state, the lid 94 is deflected as shown in FIG. 25B so that a distance a between the shaft engage portions 147 and 148 is expanded. The shaft engage portion 148 is then engaged with the rectangular shaft portion 140b of the shaft member 140 at a second side of the front case body 90.

The rectangular shaft portion 140b of the shaft member 140 has an arc-shaped end portion $140b_{-1}$ and tapered portions $140b_{-2}$ and each of the shaft engage portions 147 and 148 has a notch 149, so that the lid 94 can be easily mounted on the front case body 90.

II. The structure 139 for pivotally supporting the lid 94 has good durability.

As shown in FIG. 22, there is a space 150 between the U-shaped portion 141a of the spring member 141 and the cap 142a of the cap member 142. Due to the space 150, the spring member 141 can move in a direction Z1 (see FIG. 24B). As shown in FIGS. 24A, 24B and 24C, in a process for opening and closing the lid 94, when the distance between the arm portions 141b and 141c of the spring member 141 is most expanded as shown in FIG. 24B, a force is applied to the spring member 141 in the Z1 direction, so that the spring member 141 is temporarily moved in the pace 150 in the direction Z1. When the lid 94 passes through a center position between the open position and the close position and the arm portions 141b and 141b of the spring member 141 move so that the distance between these portions is narrowed, the spring member 141 moves in a direction Z2 so as to return to its original position.

As has been described above, since the spring member 141 moves in the Z1 direction, the expansion of the distance between the arm portions 141b and 141c of the spring member 141 is limited. Thus, the stress generated in the spring member 141 is decreased. As a result, the number of times which the lid 94 can be repeatedly opened and closed until the spring member 141 is broken can be increased. That is, the structure 139 for pivotally supporting the lid 94 has superior durability in comparison with the conventional structure.

Structure of Screw Cap (Mainly See FIGS. 26–30C)

The battery 55 shown in FIG. 7 is smaller than a conventional one. Since the battery is miniaturized, a battery mounting portion 111 is also miniaturized. The screws $124_{-1}$ and $124_{-2}$ among the screws $124_{-1}$–$124_{-5}$ are located on the outside of the battery mounting portion 111. Thus, it is necessary to provide a screw cap for hiding heads of the screws $124_{-1}$ and $124_{-2}$.

Figure 26:
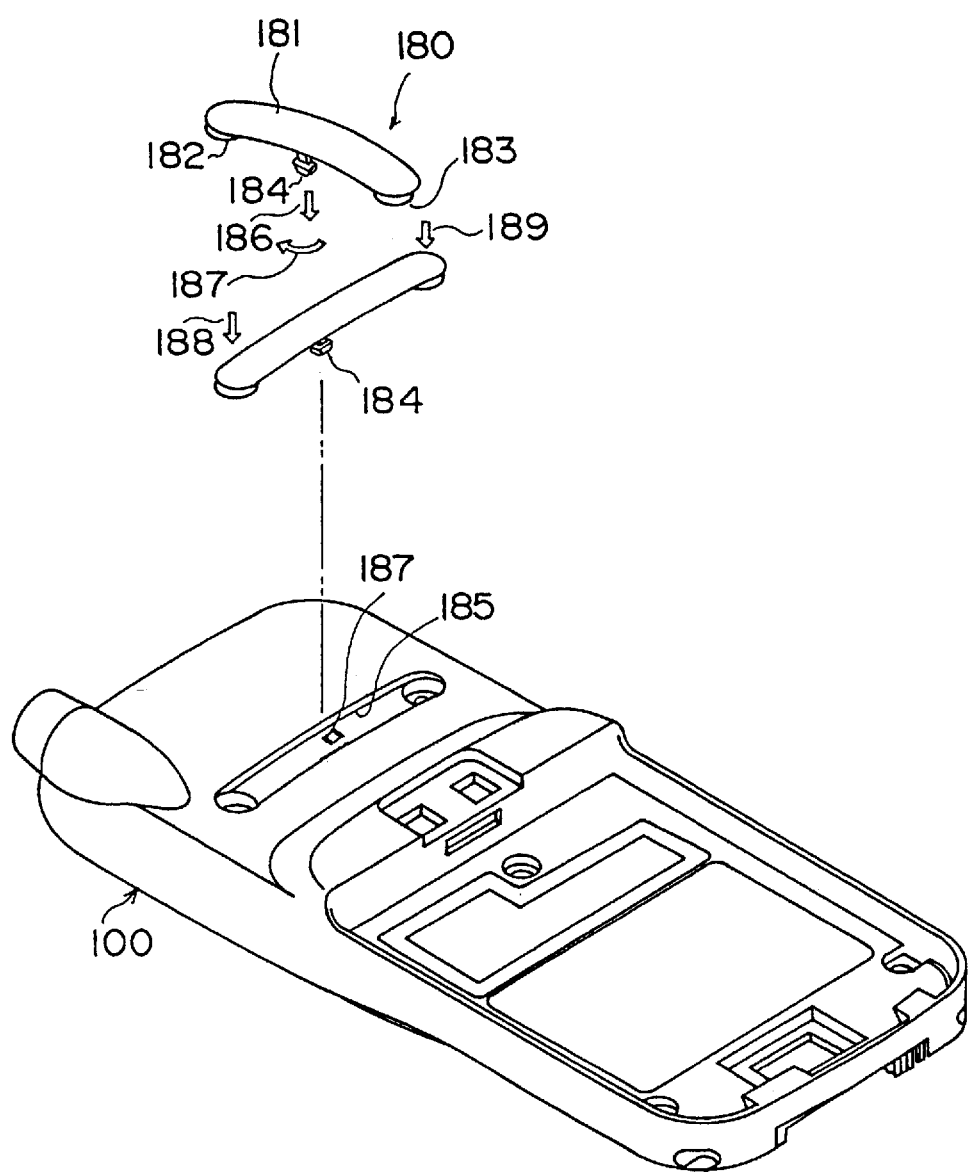
FIG. 26 is a perspective view showing a structure of a screw cap mounted on the rear case assembly.
Figure 27:
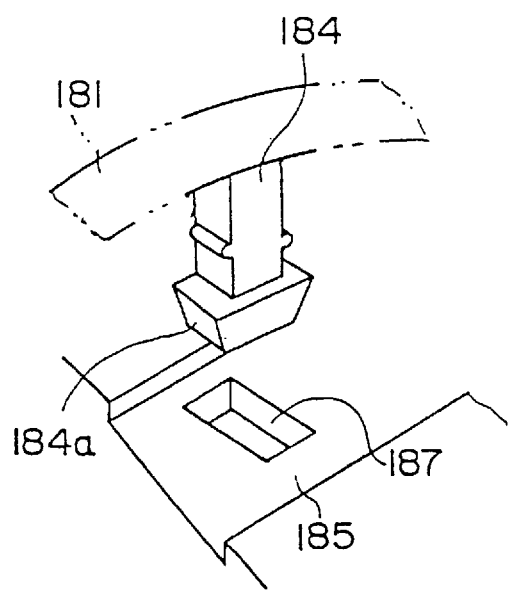
FIG. 27 is a diagram illustrating a structure of the screw cap.
Figure 28A:
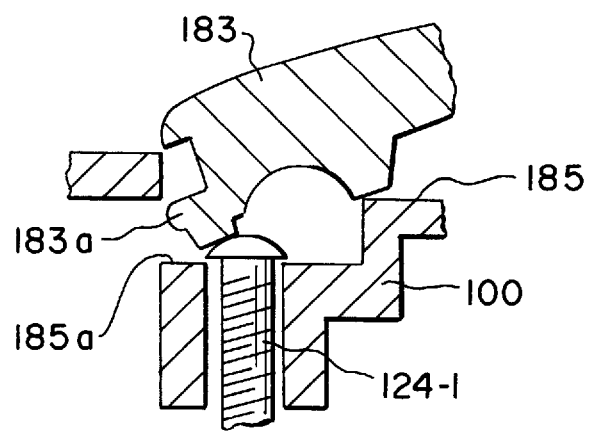
FIGS. 28A and 28B are diagrams illustrating states where a head of a screw is covered by the screw cap.
Figure 28B:
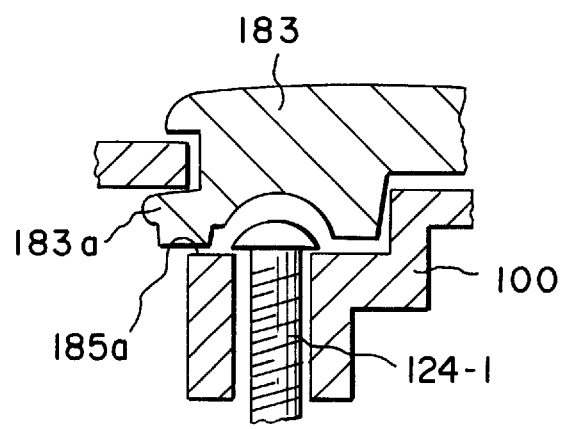

As shown in FIG. 26, a screw cap member 180 has a beam portion 181, screw caps 182 and 183 provide at both ends of the beam portion 181 and a shaft 184 provided at the center of the beam portion 181. As shown in FIGS. 28A and 28B, the screw cap 183 has a click portion 183a. A groove 185 with which the screw cap member 180 is engaged is formed on the rear case body 100. Holes 185a with which the click portions 183a of the screw caps 183 are engaged are formed at both ends of the groove 185. As shown in FIG. 27, a rectangular shaped click portion 184a is formed at the end of the shaft 184. The long side of the rectangular shaped click portion 184a extends in a longitudinal direction of the beam portion 181. A hole 187 is formed at a center of the groove 185 of the rear case body 100. The hole 187 has a rectangular shape extending in a width direction of the groove 185 (perpendicular to the longitudinal direction of the groove 185).

The screw cap member 180 is positioned so as to be perpendicular to the groove 185, and is then pushed in a direction 186 so that the rectangular shaped click 184a is inserted in the hole 187. The shaft 184 is then fitted in the hole 187. After this, the screw cap member 180 is rotated by 90° so that the direction in which the beam portion 181 extends is the same as that of the groove 185. Both ends of the beam portion 181 are pushed in a direction indicated by references 188 and 189 so that the screw cap member 180 is fitted in the groove 185. When both ends of the beam portion 181 are pushed, the screw cap 183 (182) is pressed against the groove 185 and the click portion 183a of the screw cap 183 is engaged with the hole 185a (as shown in FIGS. 28A and 28B). As a result, the screw caps 182 and 183 cover the heads of the screws $124_{-1}$ and $124_{-2}$.

In a case where the screw cap member 180 is removed from the groove 185, a nail or a jig is inserted between the screw cap member 180 and the groove 185, and the screw cap member 180 is lifted up in a direction opposite to the direction 186 until the screw caps 182 and 183 are removed from the holes 185a. After this, a procedure reverse to the procedure by which the screw cap member 180 is engaged with the groove 185 is performed.

In the work for removing the screw cap member 180 from the groove 185, unless the screw cap member 180 is first rotated by 90°, the screw cap member 180 can not be removed from the groove 185. Thus, the screw cap member 180 is prevented from being inadvertently removed from the groove 185.

Mounting Structure of Rubber Tube 67 Shown in FIG. 9

(See FIGS. 29A–29E)

As shown in FIG. 29C, clicks $60a_{-1}$ are formed in the groove 60a of the chassis 60. The width m of the groove 60a is slightly smaller than the diameter d of the rubber tube 67. If the diameter d is smaller than the width 11, the cases are not fitted to the chassis 60 due to the fitting error. The rubber tube 67 is pushed in the groove 60*a* as shown in FIG. 29D and is put back as shown in FIG. 29E so as to be fixed in the groove 60*a*.

Mounting Printed-Ciruit Boared Shown in FIG. 9 on Chassis 60

(See FIGS. 30A–32E)

A mounting structure of the printed-circuit board 63 (TU) on the chassis 60 is shown in FIG. 30A, 30B and 30C. In order to prevent tall parts among the parts mounted on the printed-circuit board 63 from hitting the chassis 60, a flat concave portion 200 is formed on the chassis 60. A path 201 through which a coaxial pipe 203 lead from the external connector passes is formed on the chassis 60. A concave portion 202 having a depth greater than that of the path 201 is used as a path through which the rubber tube 67 passes. The concave portion 202 is formed under the coaxial pipe 203. To fix the printed-circuit board 63 on the chassis 60, the chassis 60 is provided with the clicks 60*c* and 60*c'* which have slightly different shapes. The clicks 60*c* and 60*c'* also have a function to prevent the printed-circuit board 63 from falling out of the chassis 60.

A description will now be given of how the printed-circuit board 63 is mounted on the chassis 60.

FIG. 31B is a cross sectional view, taken along line B—B shown in FIG. 31A, showing a structure in which the printed-circuit board 63 has been already mounted on the chassis 60. An engaging length 11 of that portion of the printed-circuit board 63 engaged with the click 60*c'* is smaller than an engaging length 12 of that portion of the printed-circuit board 63 engaged with the click 60*c* (11<12). Thus, in a case where a wall 204 on which the click 60*c'* is formed is pushed in a direction B (an outer direction), the printed-circuit board 63 can be easily removed from the click 60*c'* in comparison with in a case where a wall 205 on which the click 60*c* is formed is pushed in a direction C (an outer direction). To easily mount the printed-circuit board 63 on the chassis 60, first, the first edge of the printed-circuit board 63 is engaged with the click 60*c*, and the second edge of the printed-circuit board 60 is then engaged with the click 60*c'*.

The printed-circuit board 63 is mounted on the chassis 60 in accordance with a procedure shown in FIGS. 32A–32E.

First, the first edge of the printed-circuit board 63 is engaged with the click 60*c* of the wall 205. The boss 60*b* is inserted in a hole formed in the printed-circuit board 63, the connector 64 is inserted in a hole formed on the chassis 60, and the wall 204 is pushed in the direction B so that the distance between the walls 204 and 205 is expanded. In this state, the printed-circuit board 63 is set between the walls 204 and 205 on the chassis 60. After this, when the pushing of the wall 204 is interrupted, the wall 204 returns to its original state, so that the second edge of the printed-circuit board 63 is engaged with the click 60*c'* of the wall 204. In this state, the rubber tube 67 is put back by the click 60*a*₋₁ so as to project from the groove 60*a*. Thus, in the case where the printed-circuit board 63 is mounted on he chassis 60, the rubber tube 67 is pushed by the printed-circuit board 63, and the earth pattern on the printed-circuit board 63 is in tight contact with the rubber tube 67. A procedure in which the printed-circuit board 63 is removed from the chassis 60 is reverse to the above procedure in which the printed-circuit board 63 is mounted on the chassis 60.

The procedure in which the printed-circuit board 63 is mounted on and removed from the chassis 60 depends on the difference between the engaging lengths for the printed-circuit board 63 at the walls 204 and 205.

Mounting Structure of Shield Plates 62 and 72 Shown in FIGS. 8 and 9

(Mainly See FIGS. 33A–35C)

The structures of the two shield plates 62 and 72 (a T/R shield plate and an L-shield plate) are shown in FIGS. 33A–33E.

As shown in FIGS. 33A and 33B, the L-shield plate 72 is set on the printed-circuit board 73 on which the keyboard 77 is mounted. Escape holes 72*a* for LED 77*b* (twelve) and key switches 77*a* (twenty one) are formed on the L-shield plate 72. The L-shield plate 72 is provided with a nail-shaped bending portion 210 formed at each side of the L-shield plate 72. The nail-shaped bending portion 210 functions as a spring. The bending portion 210 is inserted in the U-shaped groove 60*e* of the chassis 60.

As shown in FIGS. 33C, 33D and 33E, the T/R shield plate 62 has bending portions 212, 215 and 216 formed edges thereof. The T/R shield plate 62 is fixed on the printed-circuit board 63 by using screws. The bending portion 212 is used to prevent radio waves from leaking to the external connecter. In the state where the T/R shield plate 62 is mounted on the printed-circuit board 63, the bending portion 212 covers the external connector 65 of the printed-circuit board 63. The bending portion 216 has a spring leaf 216*a* for strongly pressing the T/R shield plate 62 against the printed-circuit board 63. The spring leaf 216*a* is in contact with a printed pattern on the printed-circuit board 63, as shown in FIG. 33E. The bending portion 215 has a nail-shaped portion 215*a* which functions as a spring in the same manner as the bending portion 210 of the L-shield plate 72. Seven holes 217 used to adjust capacitance and resistance of parts mounted on the printed-circuit board 63 are formed on the T/R shield plate 62. The T/R shield plate 62 is provided with escape portions 218 for preventing tall parts on the printed-circuit board 63 from coming in contact with the T/R shield plate 62. As shown in FIG. 8, the U-shaped groove 219 used to fix the holder 80 is formed on the chassis 60.

The shield plates and the holder are mounted on the chassis as follows.

Figure 34A:
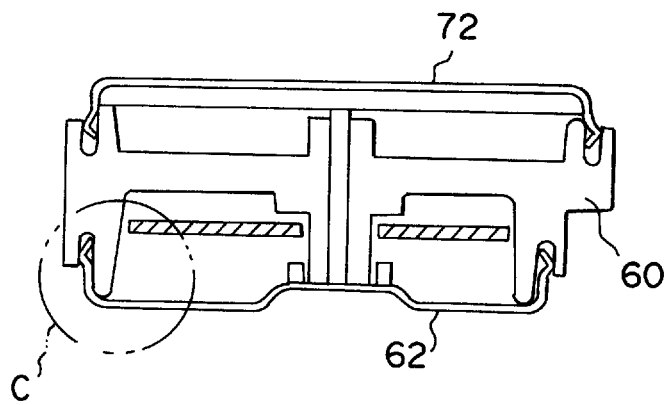
FIGS. 34A, 34B, 34C, 34D and 34E are diagrams illustrating the structure in which the shield plates are mounted on the chassis.
Figure 34B:
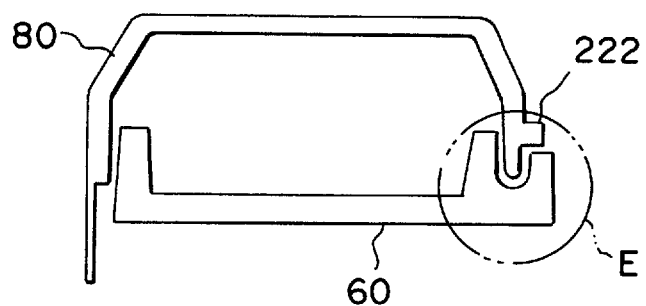
Figure 34C:
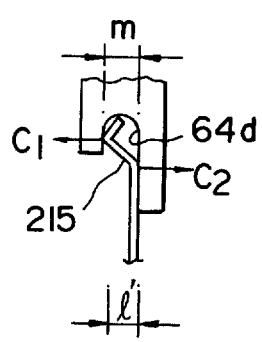
Figure 34D:
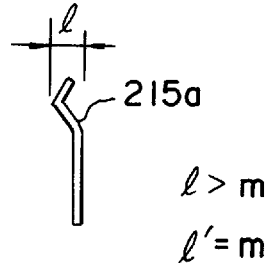

FIG. 34A shows a cross section of a structure in which the two shield plates are mounted on the chassis. The width l of the nail-shaped portion 215*a* of the bending portion 215 formed on the T/R shield plate 72 is greater than the width m of the U-shaped groove 64*d* formed on the chassis 60 (l>m) (see FIGS. 34C and 34D). As shown in FIG. 34C, the nail-shaped portion 215*a* which functions as a spring is inserted in the U-shaped groove 64. In this case, since the width l of the nail-shaped portion 215*a* is greater than the width m of the U-shaped groove 64*d* (l>m), the nail-shaped portion 215*a* is distorted so that the widths l and m become equal to each other. In this state, the U-shaped groove 64*d* is pushed by the nail-shaped portion 215*a* at two contact point in two directions C1 and C2 as shown in FIG. 34C, so that the T/R shield plate 62 are electrically connected to each other. The L-shield plate 72 is mounted on the chassis 60 in the same manner as the T/R shield plate 62.

Figure 34E:
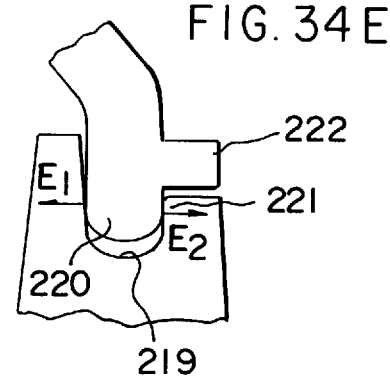

As to the holder 80, a convex portion 220 of the holder 80 is fitted in the U-shaped groove 219 formed on the chassis 60. To obtain a wide contact area on which a metal-plated portion of the holder 80 is in contact with the chassis 60, the holder 80 is provided with a few stoppers 222. The chassis 60 and he holder 80 are electrically connected via the convex portion 220, the stoppers 222 and a strait portion 221 of the U-shaped groove 221, as shown in FIG. 34E.

Figure 35A:
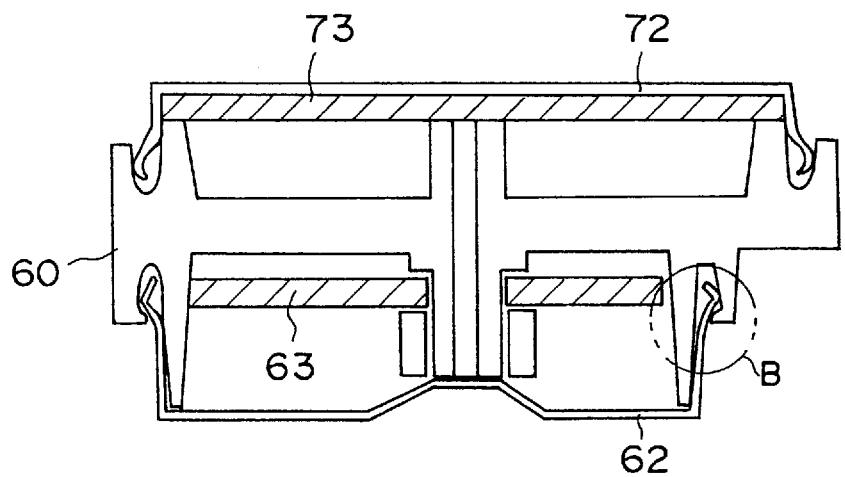
FIGS. 35A, 35B and 35C are diagrams illustrating a modification of the structure in which the shield plates are mounted on the chassis.
Figure 35B:
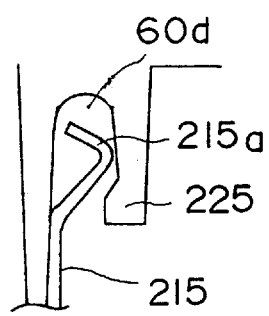
Figure 35C:
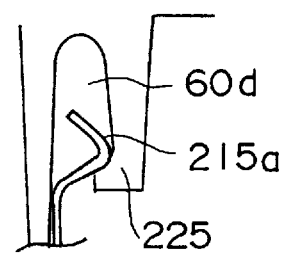

As shown in FIGS. 35A–35C, the U-shaped groove 60d of the chassis 60 may be provided with a nail portion 225. The nail portion 225 prevents the nail-shaped portion 215a of the T/R shield plate 62 from falling out from the U-shaped groove 60d by the draft angle of the U-shaped groove 60d. Even if the nail-shaped portion 215a falls out from the U-shaped groove 60d, the nail-shaped portion 215a hits on the nail portion 225 and the nail portion 225 functions as a stopper. As a result, the T/R shield plate 62 does not fall out from the chassis 60.

Structure of Holder (Mainly See FIGS. 36A–40E)

A structure of the holder is shown in FIGS. 36A–36C. The holder 80 has a portion 230 on which the loudspeaker is provisionally mounted and a portion 231 on which a rubber bush ring for preventing leakage of sound or gasket 240 is fixed by using an adhesive double-coated tape. A wall 232 for positioning the gasket 240 is formed. Nail portions 234 and 235 are used to mount a small circuit board 236. A nail 237 is used to fix a cable 238 led from the loudspeaker 82. The amount of a side of the small circuit board engaged with the nail portion 234 slightly differs from the amount of a side of the small circuit board engaged with the nail portion 235.

A mounting structure of the small circuit of the holder is shown in FIGS. 37A–37D.

The amount l1 of the nail portion 235 engaged with the small circuit board 81 is less than the amount l2 of the nail portion 234 engaged with the small circuit board 81 (l1<l2).

Figure 37A:
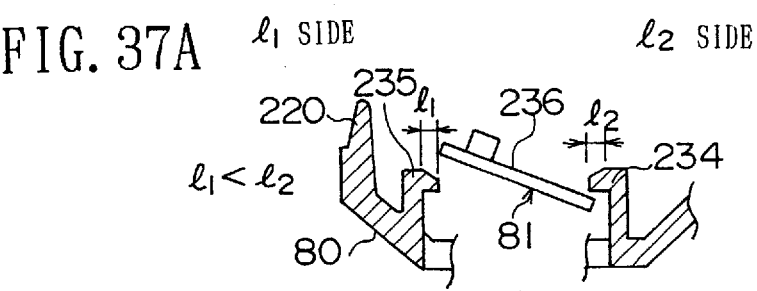
FIGS. 37A, 37B, 37C and 37D are diagrams illustrating attachment of a small circuit board to the holder.
Figure 37B:
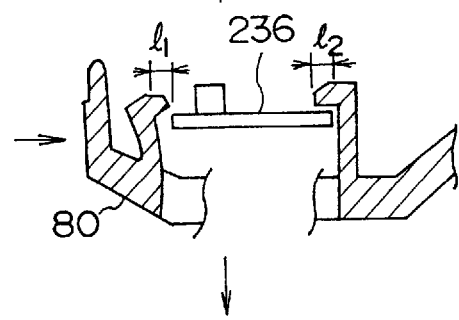
Figure 37C:
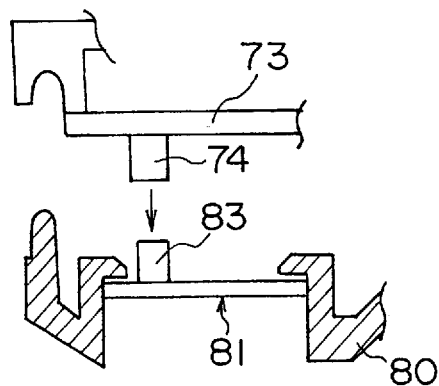
Figure 37D:
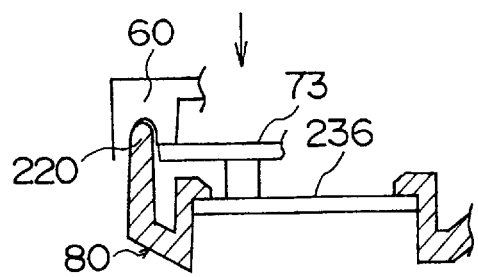

As shown in FIG. 37A, first, a first side of the small circuit board 81 is engaged with the nail portion 234 (corresponding to l2). A second side of the small circuit board 81 is then engaged with the nail portion 235 (corresponding to l1) as shown in FIG. 37B. The connector 83 on the small circuit board 81 and the connector 74 on the printed-circuit board 73 are connected to each other, so that the convex portion 220 of the holder is inserted in the U-shaped groove 219 of the chassis 60, as shown in FIGS. 37C and 37D. As a result, the holder 80 is fixed on the chassis 60.

Figures 1, 38A:
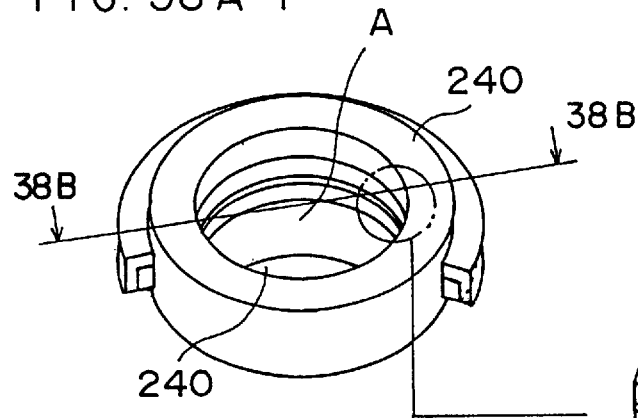
FIG. 38A is a diagram illustrating a gasket used for mounting a loudspeaker to the holder.
Figures 2, 38A:
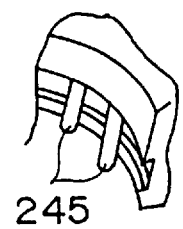
Figure 38B:
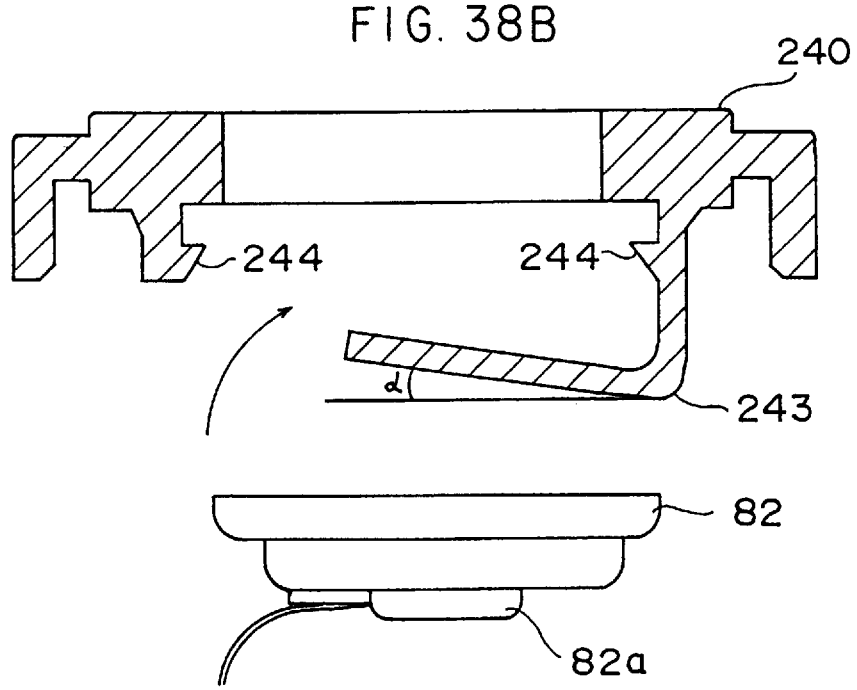
FIG. 38B is a cross sectional view taken along line B—B shown in FIG. 38A.

The loudspeaker is mounted on the holder as shown in FIGS. 38A and 38B.

Referring to FIGS. 38A and 38B, the loudspeaker 82 is set on the gasket 240 on which the adhesive double-coated tape is provided. This structure is set in the wall so that the holder 80 and gasket 240 are adhered to each other by the adhesive double-coated tape. The cable 238 led from the loudspeaker 82 trails over the nail. The diameter of the loudspeaker 82 is greater than the inside diameter of the gasket, so that the loudspeaker 82 does not fall out from the holder 80.

The gasket 240 may have a structure by which the loudspeaker 82 is covered or a structure by which the loudspeaker 82 can be mounted without the adhesive double-coated tape.

The structure of the gasket 240 is shown in FIGS. 38A and 38B. In FIG. 38A, the loudspeaker 82 is set in a portion A. In a state where the loudspeaker 82 is set in the portion A of the gasket 240, a bottom 82a of the loudspeaker 82 is set on a circular bottom portion 243 of the gasket 240. The circle bottom portion 243 has a function for pushing up the bottom 82a of the loudspeaker 82 set thereon. The gasket 240 is provided with a stopper 244 for preventing the loudspeaker 82 set in the gasket 240 from falling out. the gasket 240 is also provided with two guide portions 245 used to position the loudspeaker 82. The circle bottom portion 243 of the gasket 240 has an inclination α so as to push the loudspeaker 82 set thereon.

Figure 39A:
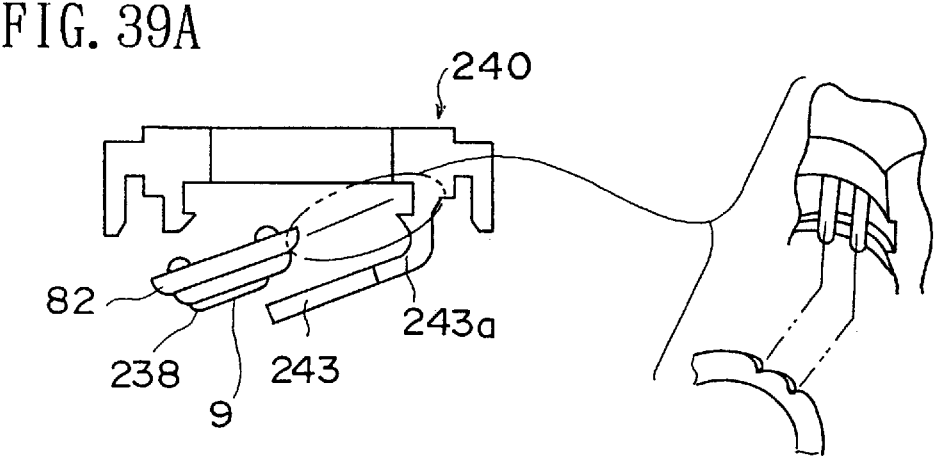
FIGS. 39A and 39B are diagrams illustrating attachment of the loudspeaker to the gasket.
Figure 39B:
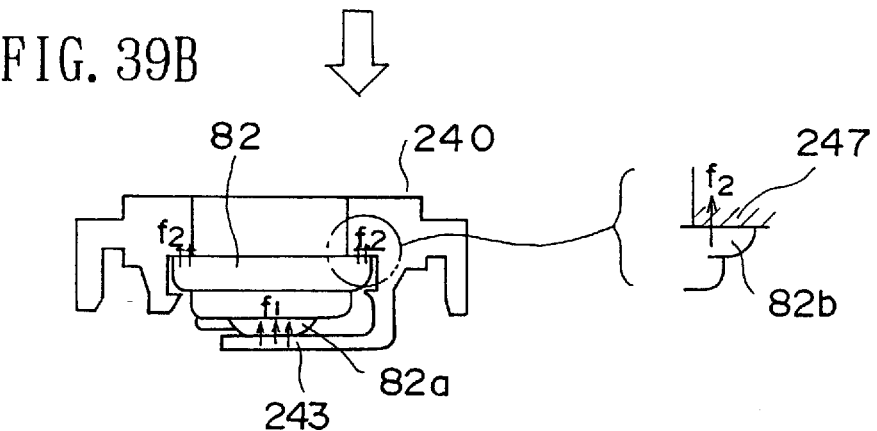
Figures 1, 2, 40E:
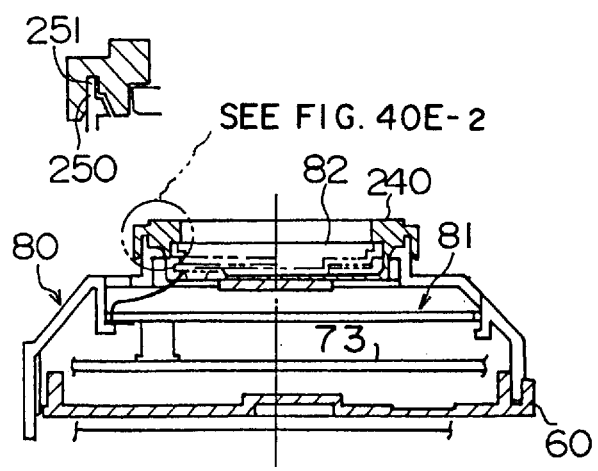

FIGS. 39A and 39B show the loudspeaker 82 mounted in the gasket.

The loudspeaker 82 is set on the circle bottom portion 243 so that the cable 238 is located at a position opposite to the base 243a of the circle bottom portion 243. The circle bottom portion 243 is expanded and the concave portion 246 of the loudspeaker 82 is put upon the guide portions 245. The head portion 82b of the loudspeaker 82 is pushed in the space formed by the stopper 240. In a state where the loudspeaker 82 is set on the circle bottom portion 243, the bottom 82a of the speaker 82 is put in tightly contact with the circle bottom portion 243 by a force f1 of the circle bottom portion 243 of the gasket 240. Thus, the speaker 82 is provisionally mounted in the gasket 240. In this case, a force f2 is applied to a portion of the gasket 240 with which the head portion 82b of the loudspeaker 82 is brought into contact due to the force f1 of the circle bottom portion 243 of the gasket 240.

The gasket 240 is provided with a groove 251. The groove 251 has the width l slightly greater than the thickness m of the rib 250 used to position the holder 80 (l>m).

As shown in FIGS. 40B and 40D, the rib 250 of the holder 80 is fitted in the groove 251 of the gasket 240 so that the gasket 240 in which the loudspeaker 82 is set is mounted on the holder 80. In this case, the cable 238 is located at a position close to the nail portion 253 of the holder 80 and passes through a hole 254 so as to trail over the nail portion 253.

After this, the cable is connected to the small circuit board by solder, the small circuit is engaged with the nail portions of the holder, and the holder is inserted in the chassis on which parts such as the printed-circuit board are mounted. As a result, the holder is fixed on the chassis.

According to the above structure using the gasket 240, the vibration from the holder and a frame is absorbed by the gasket 240, but is not transmitted to the loudspeaker 82. Thus, the loudspeaker 82 is prevented from malfunctioning based on the vibration.

Structure in Which Microphone is Mounted on Printed-Circuit Board (See FIGS. 41A–41D)

FIGS. 41A–41D show a structure in which the microphone is mounted on the printed-circuit board (LOG). The microphone 79 is inserted in a direction A in a microphone bush 260. An upper connector 261 of the external connector is provided with a nail portion 263 which is to be engaged with a hole 262 of the printed-circuit board (LOC) 73. The upper connector 261 also has positioning pins 265 which are to be engaged with other holes 264 formed on the printed-circuit board (LOC) 73. The end of each of the positioning pins 265 is tapered so that the positioning pins 265 can be easily inserted in the holes 264. A nail portion 266 formed at an end of the upper connector 261 is used to hook the upper connector 261 on the printed-circuit board 73 (LOG). To prevent the bottom portion 270 of the microphone bush 260 from hitting on the upper connector 261, the upper connector 261 is provided with a groove 267.

In a case where the microphone bush 260 in which the microphone 79 is set is mounted in a direction B on the printed-circuit board (LOG) 73, since the diameter of a C-portion of the microphone bush 260 is greater than a groove 268 of the printed-circuit board (LOG) 73, when the C-portion passes through the groove, the C-portion is constricted by the groove 268. The C-portion of the microphone bush 260 is then inserted in a hole 269. The lead wires of the microphone 79 are connected to the printed-circuit board (LOG) 73 by the solder. The diameter of the microphone bush 260 is greater than the width of the groove 268 and the diameter of the hole 269. Thus, the bottom portion 270 of the microphone bush 260 prevents the microphone bush 260 from falling out from the hole 269. Due to the engagement of the nail portion 263 and the positioning pins 265 with the holes 262 and 264 and the engagement of the nail portion 266 with the printed-circuit board (LOG) 73, the upper connector 261 is provisionally mounted on the printed-circuit board (LOG) 73. Furthermore, the lead wires 271 and a plurality of pins 272 are fixed by the solder on the printed-circuit board (LOG) 73, so that the upper connector 261 is completely fixed on the printed-circuit board (LOG) 73.

According to the above, the microphone 79 and the alert 78 are mounted, as a part of a module, on the printed-circuit board (LOG) 73.

Mounting Structure of Strap Pin (See FIGS. 42A–42D)

The mounting structure of a strap pin is shown in FIGS. 42A–42D.

The rear case body 100 is provided with a hole 281 through which a strap pin 280 should pass. A hole 282 is formed in the rear case body 100. The inner diameter of the hole 281 is slightly greater than the diameter of the strap pin 280, and the inner diameter of the hole 281 is equal to the diameter of the strap pin 280. To prevent the strap pin 280 from falling out from the holes 281 and 282 in a direction C, a pushing rib 283 is formed on the chassis 60. In a state where the chassis 60 is mounted in the rear case body 100, the rib 283 functions as a stopper for preventing the strap pin 280 from falling out. The rim of the hole 281 is tapered so that the strap pin 280 can be easily inserted in the hole 281.

First, the strap pin 280 is inserted in the hole 281. At this time, since the diameter d of the strap pin 280 is less than the inner diameter d'1 of the hole 281 (d<d'1) and the rim of the hole 281 is tapered, the strap pin 280 can be easily inserted in the hole 281. Next, the strap pin 280 is pressed in the hole 282. That is, although the diameter d of the strap pin 280 is equal to the inner diameter d'2 of the hole 282 (d=d'2), the strap pin 280 can be inserted in the hole 282 by pressing. The strap pin 280 is pressed in the hole 282 until an end of the strap pin 280 reaches at least a surface D. In the sate where the chassis 60 is mounted in the rear case body 100, the rib 283 is positioned over the strap pin 280.

The strap pin 280 is clamped by the hole 282 and the rib 283 prevent the strap pin 280 from falling out, so that the strap pin 280 is fixed in the rear case body 100. Since the strap pin 280 is supported by the two holes 281 and 282, the strap pin 280 can bear the load applied thereto in a direction E.

As has been described above, the structure in which the strap pin 280 is mounted in the rear case body 100 has the following features.

1) The rib 283 formed on a frame functions as a stopper for preventing the strap pin 280 from falling out.

2) The hole 282 is formed on the outer surface of the rear case body 100, and the strap pin 280 is inserted in the hole 282 by the pressing. Thus, even if the strap pin 280 mounted in the rear case body 100 is pulled, the strap pin 280 is not distorted.

3) The rim of the hole 281 through which the strap pin 280 should pass is tapered. Thus, the strap pin 280 can be easily inserted in the hole 281.

Modification of Mounting Structure of Lid (See FIGS. 43–47B)

In this modification, the lid has shafts and the case body has engaging portions.

Figure 43:
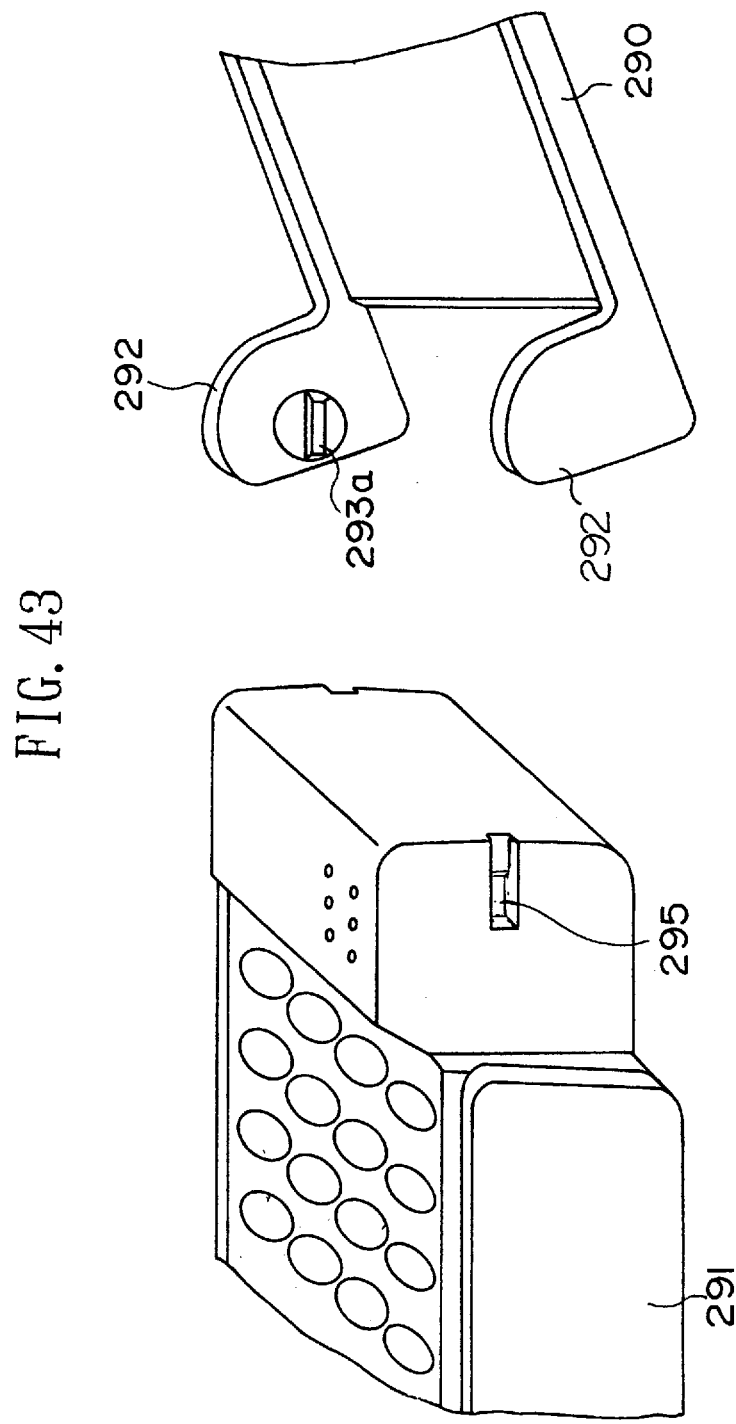
FIG. 43 is a diagram illustrating a modification of the structure in which the lid is attached to the case.
Figure 44:
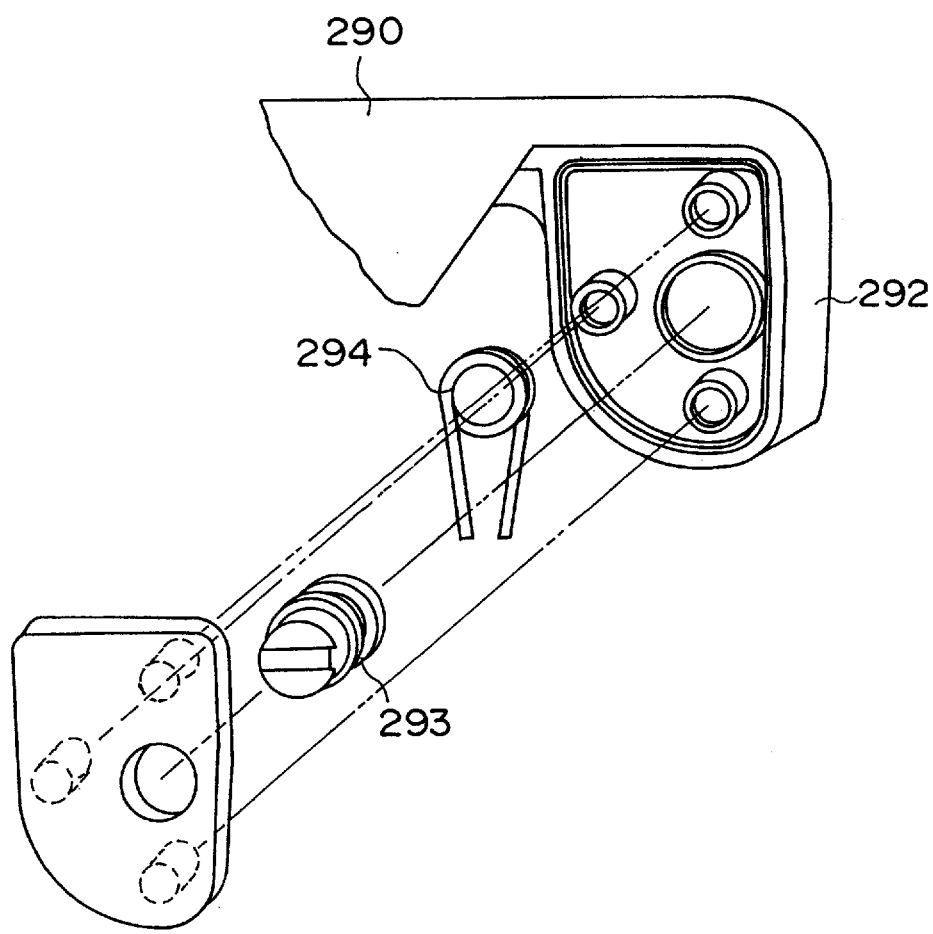
FIG. 44 is an exploded perspective view illustrating an inner structure of a flange portion of the lid.
Figure 45:
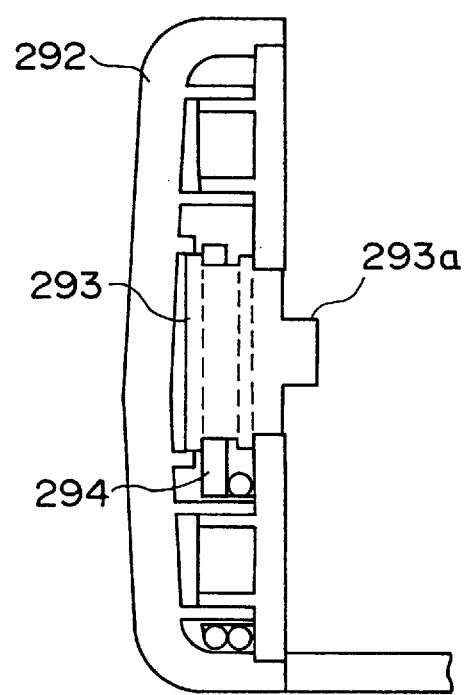
FIG. 45 is a diagram illustrating the inner structure of the flange portion of the lid.

FIGS. 43–45 shows a structure in which the lid 290 is mounted on a telephone body 291. As shown in FIGS. 44 and 45, a shaft member 293 and a spring 294 are mounted in each flange portion 292 of the lid 290. The shaft member 293 has a rectangular block 293a, and the rectangular block 293a projects inside from the flange portion 292 in a state where the shaft member 293 is mounted in the flange portion 292 as shown in FIG. 45. As shown in FIG. 43, an engagement groove 295 is formed on the telephone body 291.

In a case where the lid 290 is mounted on the telephone body 291, the distance between the flange portions 292 is expanded by using the elasticity of material of which the lid 290 is made, and the rectangular blocks 293a of the shaft members 293 are fitted in the engagement grooves 295 of the telephone body 291. In a case where the lid 290 is removed from the telephone body 291, the lid 290 is pulled in a state where the lid 290 is maintained at an angle, so that the rectangular block 293b of the shaft member 293 slides in the engagement groove and the lid 290 is removed from the telephone body 291.

FIGS. 46A–47B show portable telephones 300 and 301 having other modifications of the structure in which the lid is mounted.

Figure 46A:
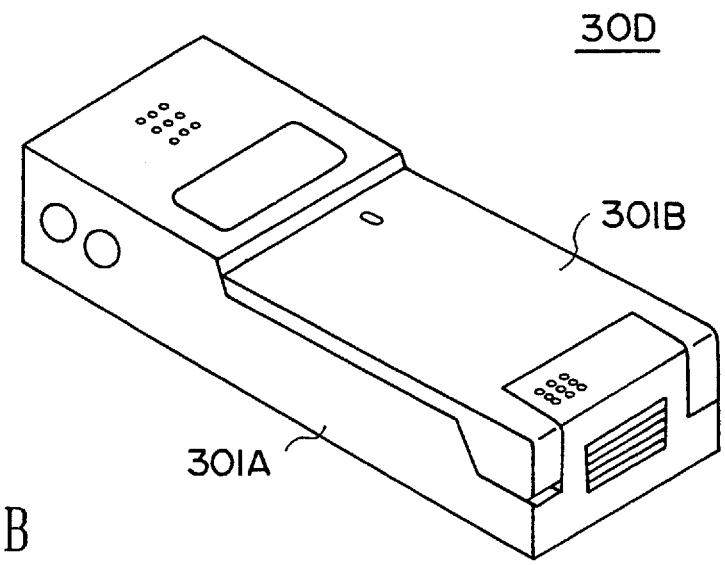
FIGS. 46A and 46B are diagrams illustrating an exterior view of a first modification of the portable telephone.
Figure 46B:
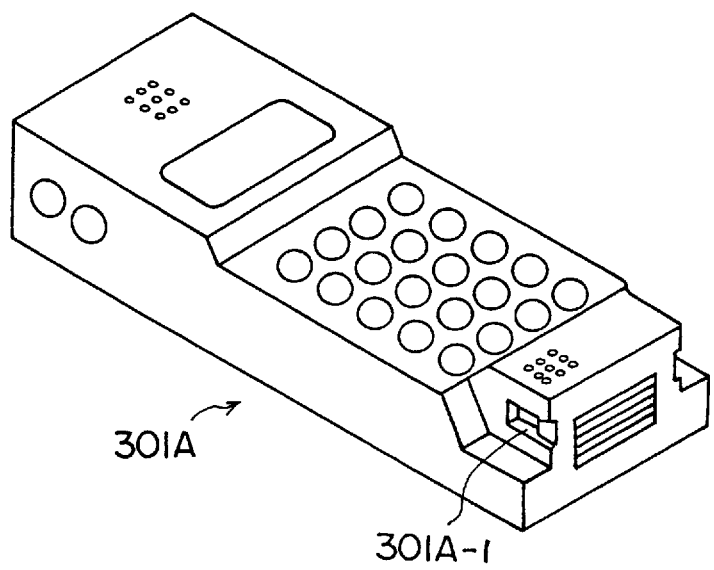

In FIGS. 46A and 46B, a lid 301B is mounted on a telephone body 301A by using engagement portions 301A-1 formed on the telephone body 301A.

Figure 47A:
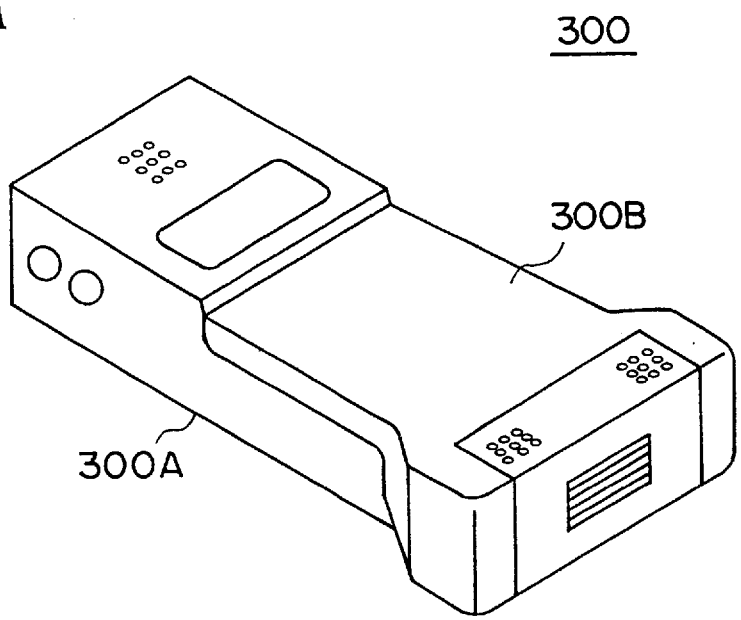
FIGS. 47A and 47B are diagram illustrating an exterior view of a second modification of the portable telephone.
Figure 47B:
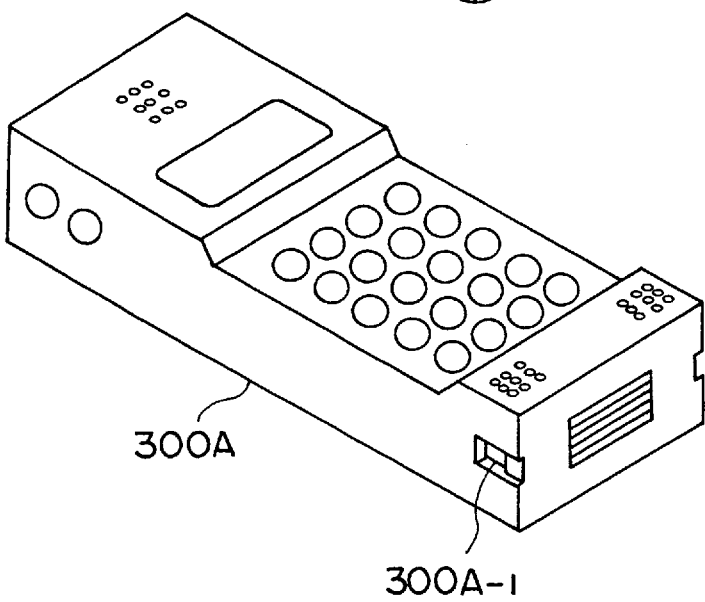

In FIGS. 47A and 47B, a lid 300B is mounted on a telephone body 300A by using engagement portions 300A-1 formed on the telephone body 300A.

The present invention may be applicable to other portable remote terminals, such as a portable radio station.

The present invention is not limited to the aforementioned embodiments, and variations and modifications may be made without departing from the scope of the claimed invention.

What is claimed is:

1. A portable remote terminal comprising:

a case having a front case assembly and a rear case assembly; and a remote terminal body assembly into which at least a printed-circuit board having electric circuits required for said portable remote terminal, a loudspeaker electrically connected to said printed-circuit board and at least a shield plate for shielding said printed-circuit board are assembled, said printed-circuit board, said loudspeaker and said shield plate being operably coupled to each other, said remote terminal body assembly being housed in said case, said printed-circuit board being covered with said shield plate, wherein said remote terminal body assembly, having said printed-circuit board, said loudspeaker and said shield plate being operably coupled to each other, is capable of being tested when said remote terminal body assembly is separated from said front and rear case assemblies.

2. The portable remote terminal as claimed in claim 1, wherein said remote terminal body assembly further comprises a microphone assembled thereinto, said microphone being electrically connected to said printed-circuit board.

3. The portable remote terminal as claimed in claim 1, wherein said case is formed of a first case assembly and a second case assembly.

4. The portable remote terminal as claimed in claim 3, wherein said first case assembly comprises:

a first case body;

a lid for covering keys; and a mechanism for pivotally supporting said lid so that said lid can be at a close position at which said lid covers the keys and at an open position at which the keys are exposed.

5. The portable remote terminal as claimed in claim 4, wherein said mechanism has:

a shaft member rotatably mounted in said first case body;

an engagement portion formed in said lid, said shaft member being engaged with said engagement portion so that said lid is pivotally supported on said shaft;

a polygonal block formed at an end of said shaft member; and a spring member, mounted in said first case body, having two elastic arm portions which sandwich said polygonal block so that said shaft member is pivoted with a click.

6. The portable remote terminal as claimed in claim 5, said mechanism further comprises a member for fixing said spring member in said first case body so that said two arm portions are movable in a direction perpendicular to an axis of said shaft member when said shaft member is pivoted.

7. The portable remote terminal as claimed in claim 3, wherein said second case assembly comprises:

a second case body;

an antenna; and a mechanism for electrically connecting said antenna to the printed-circuit board mounted in said remote terminal body assembly.

8. The portable remote terminal as claimed in claim 7, wherein said mechanism has a leaf spring member having a first portion which is brought into contact with said antenna by a spring force thereof and a second portion which is elastically deformed so as to be in tight contact with said printed-circuit board mounted in said remote terminal body assembly when said remote terminal body assembly is housed in said case.

9. The portable remote terminal as claimed in claim 1, wherein a holder supporting said loudspeaker and a circuit board connected to said loudspeaker is assembled into said remote terminal body assembly so that said circuit board is electrically connected to said printed-circuit board on which the electric circuits required for said portable remote terminal are formed.

10. A portable remote terminal comprising:

a case having a front case assembly and a rear case assembly; and a remote terminal body assembly into which a chassis, a first printed-circuit board, a second printed circuit board electrically connected to said first printed-circuit board, a loudspeaker, a first shield plate for shielding said first printed-circuit board and a second shield plate for shielding said second printed-circuit board are assembled, said printed-circuit boards, said loudspeaker and said shield plates being operably coupled to each other, said remote terminal body assembly being housed in said case, said printed-circuit boards being covered with said shield plates, wherein said remote terminal body assembly, having said printed-circuit boards, said loudspeaker and said shield plates being operably coupled to each other, is capable of being tested when said remote terminal body assembly is separated from said front and rear case assemblies.

11. The portable remote terminal as claimed in claim 10, wherein said first printed-circuit board is mounted on a first surface of said chassis, and said second printed-circuit board is mounted on a second surface of said chassis.

12. The portable remote terminal as claimed in claim 11, wherein said first shield plate is mounted on said chassis so as to face said first printed-circuit board, and said second shield plate is mounted on said chassis so as to face said second printed-circuit board.

13. The portable remote terminal as claimed in claim 10, wherein a holder supporting said loudspeaker and a third printed-circuit board connected to said loudspeaker is assembled into said remote terminal body assembly so that said third printed-circuit board is electrically connected to said first printed-circuit board.

* * * * *